US011415108B2

(12) United States Patent
 Ma

(10) Patent No.: US 11,415,108 B2
(45) Date of Patent: Aug. 16, 2022

(54) ENCLOSURE WITH FREQUENCY MIXING AND ABSORBING DEVICE ON OUTER SURFACE

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 294 days.

(21) Appl. No.: 16/609,826

(22) PCT Filed: Oct. 31, 2018

(86) PCT No.: PCT/CN2018/112892
§ 371 (c)(1),
(2) Date: Oct. 31, 2019

(87) PCT Pub. No.: WO2019/242195
PCT Pub. Date: Dec. 26, 2019

(65) Prior Publication Data
US 2021/0355915 A1    Nov. 18, 2021

(30) Foreign Application Priority Data

Jun. 21, 2018 (CN) .......................... 201810646400.8

(51) Int. Cl.
*F03D 13/20* (2016.01)
*F03D 80/00* (2016.01)
*E04H 12/18* (2006.01)

(52) U.S. Cl.
CPC ............. *F03D 13/20* (2016.05); *F03D 80/00* (2016.05); *E04H 12/18* (2013.01);
(Continued)

(58) Field of Classification Search
CPC ....... E04H 12/00; E04H 12/342; F03D 80/00; F03D 7/0296; F03D 13/40; F05B 2260/96;
(Continued)

(56) References Cited

U.S. PATENT DOCUMENTS 3,581,449 A * 6/1971 Huber ..................... E04H 12/00
                                                                    52/84
4,059,129 A * 11/1977 Feis .......................... F15D 1/10
                                                                    138/37

(Continued)

FOREIGN PATENT DOCUMENTS

CN    202010002845 U1    7/2010
CN       102352947 A     2/2012
(Continued)

OTHER PUBLICATIONS

International Search Report datedMar. 21, 2019; PCT/CN2018/112892.
(Continued)

*Primary Examiner* — Brent W Herring

(57) ABSTRACT

An enclosure with a frequency mixing and absorbing device on an outer surface is provided. The frequency mixing and absorbing device includes a deformable body located on an outer surface of the enclosure, the deformable body includes a flexible body and/or an elastic body, the flexible body is a flexible hollow body or a flexible solid body, the elastic body is an elastic hollow body or an elastic solid body. When the direction of the incoming flow is from left to right, it acts on the deformable body at a windward side, that is, the change (Continued)

of pressure will be converted into the volume change of the deformable body. In this way, the fluctuating energy of the incoming flow can be absorbed and stored by the deformation of the deformable body, and the fluctuating energy is transferred to the volume change.

14 Claims, 17 Drawing Sheets

(52) U.S. Cl.
CPC ..... *F05B 2240/912* (2013.01); *F05B 2260/96* (2013.01); *F05B 2260/964* (2013.01); *Y02B 10/30* (2013.01); *Y02E 10/72* (2013.01); *Y02E 10/728* (2013.01)

(58) Field of Classification Search
CPC .......... F05B 2240/912; F05B 2240/122; F05B 2240/3062; F15D 1/14; F15D 1/12; Y02E 10/72; B63B 2021/504; E04B 1/98
See application file for complete search history.

(56) References Cited

U.S. PATENT DOCUMENTS

| | | | |
|---|---|---|---|
| 4,736,701 A | 4/1988 | Kondo et al. | |
| 5,988,568 A | 11/1999 | Drews | |
| 6,347,911 B1* | 2/2002 | Blair | E01D 19/02 24/462 |
| 6,695,588 B1 | 2/2004 | Nielsen | |
| 6,896,447 B1* | 5/2005 | Taquino | E21B 17/01 405/216 |
| 8,313,302 B2* | 11/2012 | Herbst | F03D 80/00 416/235 |
| 8,770,894 B1* | 7/2014 | Allen | E21B 17/01 405/211.1 |
| 8,944,722 B1* | 2/2015 | Allen | F16L 1/123 405/216 |
| 9,444,372 B2* | 9/2016 | Yanez | H02N 2/188 |
| 11,131,109 B2* | 9/2021 | Ma | F15D 1/14 |
| 2004/0051004 A1* | 3/2004 | Bearman | F15D 1/12 244/130 |
| 2006/0153642 A1* | 7/2006 | Esselbrugge | B63B 39/005 405/216 |
| 2006/0290140 A1* | 12/2006 | Yoshida | F03D 80/60 290/55 |
| 2007/0231077 A1* | 10/2007 | Burgess | F16L 1/123 405/216 |
| 2008/0236469 A1* | 10/2008 | Masters | F16L 1/123 114/243 |
| 2011/0150631 A1 | 6/2011 | Choi et al. | |
| 2012/0291687 A1* | 11/2012 | Dehne | F16L 1/123 114/271 |
| 2013/0259684 A1 | 10/2013 | Hedeen et al. | |
| 2013/0330131 A1* | 12/2013 | Meijer | B63B 21/663 405/184.2 |
| 2015/0082743 A1* | 3/2015 | Moeller | F03D 13/40 52/857 |
| 2015/0086276 A1* | 3/2015 | Harbison | F15D 1/12 405/216 |
| 2015/0361958 A1 | 12/2015 | Wood | |
| 2016/0160499 A1* | 6/2016 | Moeller | E04B 1/40 52/2.11 |
| 2020/0056593 A1* | 2/2020 | Jensen | F03D 13/10 |
| 2021/0017784 A1* | 1/2021 | Ma | F03D 80/00 |
| 2021/0017960 A1* | 1/2021 | Ma | F03D 13/20 |
| 2021/0222428 A1* | 7/2021 | Ma | E04B 1/98 |

FOREIGN PATENT DOCUMENTS

| | | |
|---|---|---|
| CN | 102979490 A | 3/2013 |
| CN | 103452747 A | 12/2013 |
| CN | 107387334 A | 11/2017 |
| CN | 107461302 A | 12/2017 |
| CN | 107461304 A | 12/2017 |
| CN | 107740752 A | 2/2018 |
| CN | 207229307 U | 4/2018 |
| CN | 108843516 A | 11/2018 |
| EP | 0204330 A2 | 12/1986 |
| EP | 1203155 B1 | 5/2002 |
| EP | 2644886 A2 | 10/2013 |
| EP | 3480453 A1 | 5/2019 |
| GB | 2335248 A | 9/1999 |
| JP | 2003-176774 A | 6/2003 |

OTHER PUBLICATIONS

Extended European Search Report dated Jun. 10, 2020 Appln. No. 18911324.4.

First European Office Action dated Aug. 19, 2021; Appln. No. 18 911 324.4.

* cited by examiner

1

ENCLOSURE WITH FREQUENCY MIXING AND ABSORBING DEVICE ON OUTER SURFACE

This application is the national phase of International Application No. PCT//CN2018/112892, titled "ENCLOSURE WITH FREQUENCY MIXING AND ABSORBING DEVICE ON OUTER SURFACE", filed on Oct. 31, 2018, which claims the priority to Chinese Patent Application No. 201810646400.8 titled "ENCLOSURE WITH FREQUENCY MIXING AND ABSORBING DEVICE ON OUTER SURFACE", filed with the China National Intellectual Property Administration on Jun. 21, 2018, the entire disclosures thereof are incorporated herein by reference.

FIELD

The present application relates to the technical field of enclosures, and in particular to an enclosure with a frequency mixing and absorbing device on its outer surface.

BACKGROUND

Reference is made to FIG. 1-1, which is a schematic view showing the configuration of a wind turbine.

The base of the wind turbine is a tower 10, which functions to carry and enclose the entire system. Taking a tower 10 having, a circular section as an example, the tower 10 may be a steel tower or a combination of a steel tower and a concrete tower. The tower 10 carries a nacelle 30, a generator, and a rotor 20 of the wind turbine. The wind turbine including the rotor 20 and the generator is used to obtain wind energy and convert the wind energy into electric energy. The converted electric energy is transmitted through a power transmission cable 40 or a power transmission bulbar. The power transmission cable 40 shown in the figure is led out from the nacelle 30 and is position-limited by a cable retaining ring, and the cable retaining ring is arranged at a top of the tower 10 and is fixed to a cable retaining ring fixing plate 50, The power transmission cable 40 then passes a saddle bracket 60 and is suspended along an inner wall of the tower 100 to a converter cabinet 70. A tower door 80 is further provided at a lower end of the tower 100.

The electric energy obtained by the conversion is controlled by a switch cabinet of the wind turbine and is transmitted, by means of the power transmission cable 40 or the power transmission busbar, to a converter (in the converter cabinet 70) configured for performing the electric power conversion task, and after the electric energy is processed by the converter, the electric energy meeting the requirements of power grid access rule can be obtained. Therefore, the tower 10 can be regarded as a tower pole of the wind turbine, and mainly plays a supporting role in the wind turbine.

Moreover, the tower 10 hears wind loads generated by the nacelle 30, the rotor 20 and the generator, or the downwind vibrations and crosswind vibrations resulted from the structural wind loads, i.e., issues of wind-induced structural vibration.

Reference is made to FIG. 1-2, which is a schematic view showing hoisting of the tower in sections.

The tower 10 is generally installed in sections currently, as Shown in FIG. 1-2. As an example, from bottom to top, a first tower section 11, a second tower section 12, a third tower section 13, a fourth tower section 14 and a fifth tower section 15 are sequentially arranged. In the process of installing the wind turbine, the first tower section 11 is installed on a ground foundation 90 of the tower 10 first, then other tower sections are hoisted section by section, and after the tower sections are connected one another, the top of the tower 10 (the fifth tower section 15 in FIG. 2) is connected to a yaw system of the nacelle 30, and the nacelle 30 is butted to the generator, and the generator (or a gear box) is hutted to the rotor 20.

A specific hoisting process is described as follows:

before hoisting the tower 10, a foundation ring of the ground foundation 90 connected to the first tower section 11 is cleaned first, and multiple bolts (such as 120 bolts) are placed at an inner ring of the foundation ring after threads of the bolts are oiled, and meanwhile, a control cabinet of the wind turbine is hoisted into the foundation ring;

a hoisting tool is mounted at an upper end of the first tower section 11, where hoisting the first tower section 11 at the upper end thereof is performed by a main hoist, and at the same time, a hoisting tool is also mounted at a lower end of the first tower section 11, and the task of hoisting the first tower section at the lower end thereof is performed by an auxiliary hoist for the tower. The two hoists hoist the first tower section at the same time. When the altitude of the first tower section 11 is greater than the maximum diameter of the first tower section 11, the main hoist hoists up the upper end of the first tower section 11, and the auxiliary hoist stops working; when the first tower section 11 is hoisted to be perpendicular to the ground, the auxiliary hoist is removed, and the hoisting tool at the lower end of the first tower section 11 is removed;

after a flange surface of the first tower section 11 is connected, the bolts are passed through the flange surface from bottom to top, and nuts are pre-mounted and then tightened by means of an electric wrench. The nuts are tightened for at least 3 times (till the hoisting procedure of the entire wind turbine is finished, the nuts for tower connection are then tightened by means of a torque wrench to achieve a required torque value); and the hoisting processes of the rest tower sections are the same as that of the first tower section 11, and after the hoisting of the uppermost tower section is finished, it is prepared to hoist the nacelle.

The above installation procedures of butting and connection are all carried out under conditions of unpredictable local winds in a small regional environment of a wind farm. Therefore, during the hoisting and installation processes, gusts of varying strengths or continuous light wind are often encountered. As described above, these gusts or continuous wind may induce vibrations of the tower, destroy the stability of the enclosure, and endanger the on-site personnel and equipment, and delay the installation period. For example, after the fourth tower section 14 is hoisted, the fourth tower section 14 may vibrate, such that the fifth tower section 15 cannot be aligned with the fourth tower section 14; and the fastened bolts may even be broken under the action of vibrations, thereby endangering the safety.

At present, it is clearly stipulated by the project safety requirements for the hoisting process in the wind power industry that, the hoisting of a blade group is prohibited when the wind speed is greater than 6 m/s; the hoisting of the nacelle is strictly prohibited when the wind speed is greater than 8 m/s, and the hoisting of the tower is strictly prohibited when the wind speed is greater than 10 m/s. Accordingly, the on-site hoisting progress and installation period are obviously limited by the wind conditions in the local region. For the construction of wind farms at high-altitude and high mountain regions, the project duration is even more apt to be adversely affected.

The height of the tower of a modern large-scale megawatt-level wind turbine generator system can reach 60 m to 100 m. Main components such as a main frame, a sub-frame, a hub and blades (i.e., the rotor 20) and the like are mounted at the top of the tower 10. When the wind turbine generator system is in operation, in addition to the gravity of the components at the top of the tower 10 and the dynamic load generated by the rotation of the rotor, the tower 10 is impacted by the natural wind, including downwind and crosswind impacting forms. Bending moments and forces are applied onto the tower when the wind blows the rotor to rotate. The bending moments and forces generated in downwind direction are the main reasons for the damage of the tower 10, The vortices generated when the wind flows around the tower 10 may also cause lateral vibrations leading to the resonance damage of the tower 10.

When the wind blows across the tower 10, pairs of anti-symmetrical vortices arranged alternately and rotating in opposite directions, i.e., Karman vortices, are generated at left and right sides of the wake flow. The vortices shed from the tower 10 at a certain frequency, to cause lateral vibration of the tower 10 perpendicular to the wind direction, which is also referred to as wind-induced lateral vibration, i.e., vortex-induced vibration. When the vortex shedding frequency is close to the natural frequency of the tower, the tower 10 is apt to resonate and therefore be damaged.

In view of this, a technical issue to be addressed by those skilled in the art is to improve the situation that the installation of the wind turbine is restricted by regional wind conditions.

SUMMARY

An enclosure with a frequency mixing and absorbing device on an outer surface is provided according to the present application. The frequency mixing and absorbing device includes a deformable body located on the outer surface of the enclosure, the deformable body includes a flexible body and/or an elastic body, the flexible body is a flexible hollow body or a flexible solid body, the elastic body is an elastic hollow body or an elastic solid body; and the deformable body is deformable under an action of an incoming flow.

Optionally, the frequency mixing and absorbing device includes multiple deformable bodies that are arranged at intervals or connected one by one.

Optionally, the frequency mixing and absorbing device includes multiple annular bodies surrounding the enclosure, each of the annular bodies is formed by an annular deformable body or by connecting multiple independent deformable bodies, the annular body is an annular hollow body or an annular solid body, the annular hollow body is unblocked or blocked in a circumferential direction; and the multiple annular bodies are connected one by one or distributed at intervals in a height direction of the enclosure; or, the frequency mixing and absorbing device includes multiple deformable bodies, and the multiple deformable bodies are arranged to form a grid-like hollow body structure surrounding the outer surface of the enclosure, node positions of the grid-like hollow body structure are in communication or blocked; or, the frequency mixing and absorbing device includes multiple strip-shaped bodies extending in the height direction, each of the strip-shaped bodies is formed by one deformable body or by connecting multiple independent deformable bodies, the strip-shaped body is a strip-shaped hollow body or a strip-shaped solid body, the strip-shaped hollow body is blocked or blocked in the height direction, and the multiple strip-shaped bodies are connected one by one or distributed at intervals in a circumferential direction of the enclosure.

Optionally, the frequency mixing and absorbing device includes multiple deformable bodies, and the deformable bodies are distributed at intervals both in the height direction and the circumferential direction of the enclosure.

Optionally, the frequency mixing and absorbing device includes multiple rows of the deformable bodies, each row of the deformable bodies is arranged around the enclosure.

Optionally, in two adjacent rows, the upper row of deformable bodies and the lower row of deformable bodies are arranged to be staggered with respect to each other.

Optionally, in the height direction, the frequency mixing and absorbing device is divided into at least two sections, and heights and/or thicknesses of the deformable bodies arranged in different sections are different.

Optionally, in a same section of the frequency mixing and absorbing device, an intermediate row of deformable bodies is arranged between the adjacent upper and lower rows of the deformable bodies, a volume of each of the deformable bodies of the intermediate row is smaller than a volume of each of the deformable bodies of the adjacent upper and lower rows, the deformable body of the intermediate row is located right between a deformable body of the upper row and a corresponding deformable body of the lower row, or the deformable body in the intermediate row directly faces one of the deformable bodies of the upper and lower rows Optionally, the deformable body is in a rhombic shape having four concaved side walls.

Optionally, the frequency mixing and absorbing device includes multiple rows of the deformable bodies, each row of the deformable bodies is arranged around the enclosure; and multiple flow hindering protrusions are arranged between two adjacent rows of the deformable bodies.

Optionally, the frequency mixing and absorbing device includes a plurality of annular bodies surrounding the enclosure, each of the annular bodies is formed by an annular deformable body or by connecting multiple independent deformable bodies; and adjacent upper and lower annular hollow bodies are arranged at intervals, and the annular hollow body is arranged in a wave shape.

Optionally, the frequency mixing and absorbing device includes a base body surrounding the enclosure, and all of the deformable bodies distributed at intervals are arranged at the base body; and the base body is adhered to the outer surface of the enclosure; or the base body is butted at ends in a detachable manner to surround the enclosure.

Optionally, the enclosure with the frequency mixing and absorbing device on the outer surface further includes a drag reducing device, the drag reducing device includes annular grooves arranged around the outer surface of the enclosure in the circumferential direction, a cross section of each of the annular grooves is arc-shaped, a ridge-like annular rib is formed between each two adjacent upper and lower annular grooves, the drag reducing device includes the annular rib, and the drag reducing device is arranged at least in a partial height range of the enclosure.

Optionally, the annular rib includes a rigid ridge, and an elastic hollow body or a solid elastic body or a flexible hollow body or a solid flexible body below the ridge.

Optionally, the elastic hollow body or the flexible hollow body is filled with gas or fluid or elastic rubber.

Optionally, the annular groove surrounds the enclosure, and the annular groove is a continuous or partially discontinuous annular groove, and a continuous or partially discontinuous annular rib is formed between each two adjacent upper and lower annular grooves.

Optionally; the frequency mixing and absorbing device includes a base body surrounding the enclosure, the deformable body is arranged at an outer side of the base body, and the drag reducing device is arranged at an outer side of the deformable body.

Optionally, the drag reducing device includes a base portion, the annular grooves are formed at the base portion, the base portion is attached to an outer side of the frequency mixing and absorbing device; or, the deformable body is located below the ridge of the annular rib, the drag reducing device is the frequency mixing and absorbing device, and a deformable body of the drag reducing device is the deformable body of the frequency mixing and absorbing device.

Optionally; the enclosure is a tower of a wind turbine, or a television tower, or an anemometer tower, or a water building on water, or a columnar pier on land, or a columnar pillar on land; and an incoming flow is an upwind incoming flow or water flow.

Optionally, the enclosure is a tower, at least an upper portion of the tower is provided with the frequency mixing and absorbing device, and the upper portion is above ½ of a height of the tower.

When the incoming flow acts on the deformable body at a windward side, the change of pressure will be converted into the volume change of the deformable body. In this way, the fluctuating energy in the incoming flow can be absorbed and stored by the deformation of the deformable body, to realize disordering of the fluctuating energy, and the fluctuating energy is transferred to the volume change. During the process that the volume change is transferred downstream, the fluid pressure does not directly strikes the outer surface of the enclosure, instead, the fluctuating energy is consumed and submerged, or the fluctuating pressure is diffused, transferred, consumed, absorbed, homogenized, weakened, or the momentum directionality is eliminated. Therefore, with the arrangement of the deformable body, the fluctuating excitation (that is, turbulent energy) can be self-consumed and submerged, the downwind resistance is reduced, the downwind vibration is suppressed, and thereby ensuring the stability and safety of the enclosure.

That is, the deformable body is arranged actually to perform frequency mixing, absorption and homogenization to the harmonic fluctuating energy, the fluctuating momentum, and the fluctuating impulse generated by the flow rate change of the incoming flow. The fluid itself absorbs the upstream energy during transferring the energy, and the remaining energy after absorption is transferred to the surface of the solid (enclosure) which is in contact with the fluid. In this case, the surface of the enclosure obtains the energy of the incoming flow which is weakened by absorption, and after the fast or slow fluctuating frequency of the fluid of the incoming flow is absorbed by the deformable body, the amplitude and frequency of the overall fluctuation are greatly weakened, so it is called frequency mixing, and the fluctuating frequency of the fluid after frequency mixing is greatly reduced.

BRIEF DESCRIPTION OF DRAWINGS

FIG. 1-2 is a schematic view showing hoisting of the tower in sections.

FIG. 2 is a schematic view showing an embodiment of a tower according to the present application, wherein a frequency mixing and absorbing device is arranged at an upper portion of the tower.

FIG. 3 shows the frequency mixing and absorbing device at two sides of the tower in a front view.

REFERENCE NUMERALS IN FIGS. 1-1 AND 1-2

Figure 1:
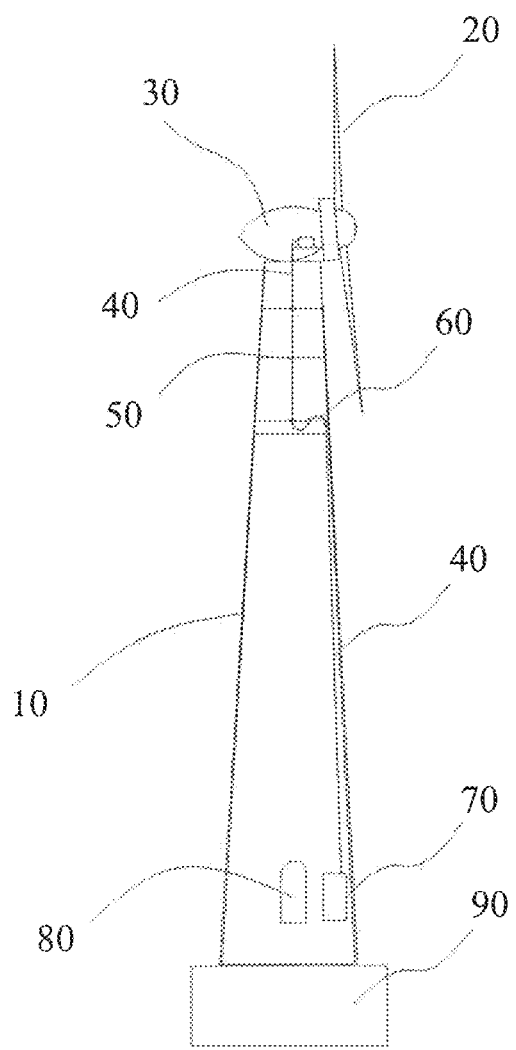
FIG. 1-1 is a schematic view showing the configuration of a wind turbine.

| 10 | tower, | 11 | first tower section, |
|---|---|---|---|
| 12 | second tower section, | 13 | third tower section, |
| 14 | fourth tower section, | 15 | fifth tower section, |
| 20 | rotor, | 30 | nacelle, |
| 40 | power transmission cable, | 50 | cable retaining ring fixing plate, |
| 60 | saddle bracket, | 70 | converter cabinet, |
| 80 | tower door, | 90 | foundation base. |

REFERENCE NUMERALS IN FIGS. 2 TO 21

| 10 | tower, | 20 | nacelle, |
|---|---|---|---|
| 30 | rotor, | 40 | foundation base, |
| 50 | drag reducing device, | 60 | frequency mixing and absorbing device, |
| 601 | flexible hollow body, | 602 | base body, |
| 603 | annular slot, | 604 | flow hindering protrusion. |
| 604a | protruding hindering string, | 501 | annular groove, |
| 501a | upper groove wail, | 501b | lower groove wall, |
| 502 | annular rib, | 502a | elastic hollow body, |
| 502b | ridge, | X | center line. |

DETAILED DESCRIPTION

For those skilled in the art to better understand technical solutions of the present application, the present application is further described in detail in conjunction with drawings and embodiments hereinafter.

Figures 1, 2:
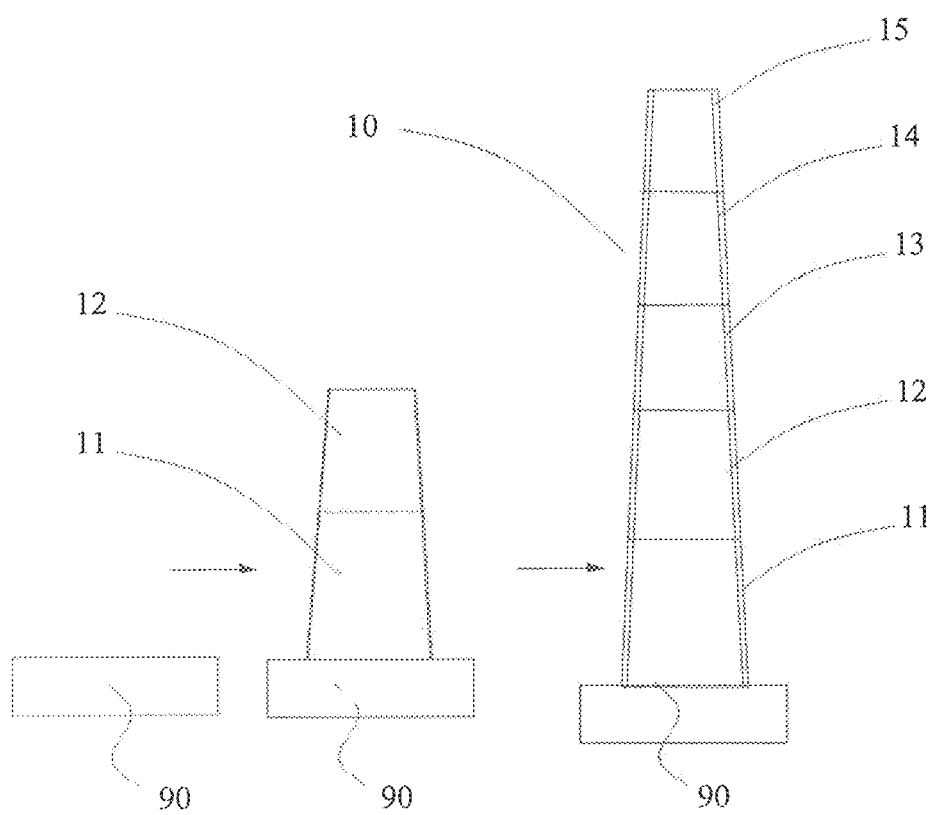
Figure 2:
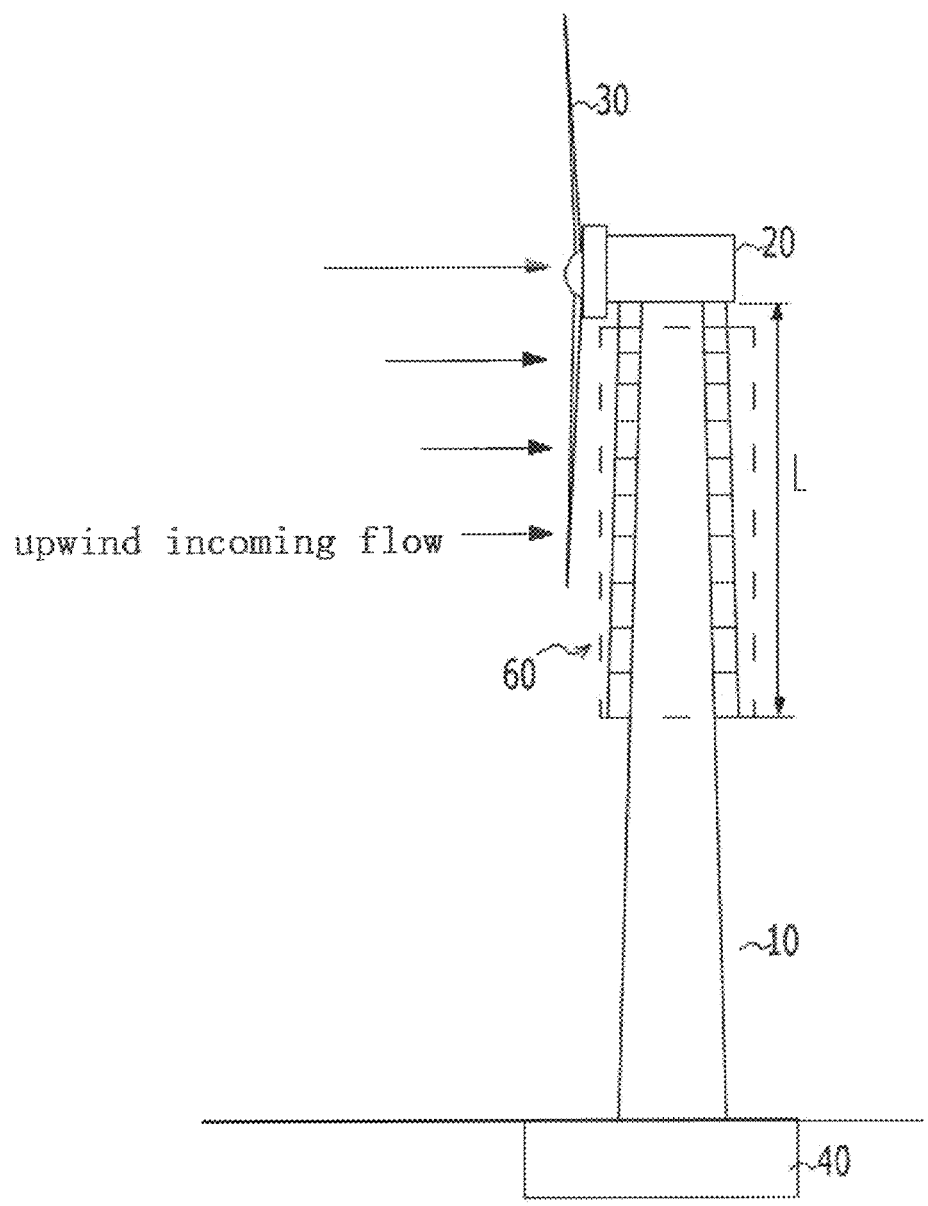

Reference is made to FIG. 2, which is a schematic view showing an embodiment of a tower 10 according to the present application, wherein a frequency mixing and absorbing device 60 is arranged at an upper portion of the tower.

This embodiment shows a specific enclosure, that is the tower 10. A nacelle 20 is arranged at a top of the tower 10, an electric generator and a prime motor are arranged in an upwind direction of the nacelle 20. The prime rotor is a wind turbine, the wind turbine includes a rotor 30, and a bottom of the tower 10 is mounted on a foundation base 40. An outer surface of the tower 10 is provided with a frequency mixing and absorbing device 60. The frequency mixing and absorbing device 60 includes a flexible hollow body 601 located on the outer surface of the tower 10, and the flexible hollow body 601 is arranged at least in a partial height range of the enclosure (shown in FIG. 3). In FIG. 2, the frequency mixing and absorbing device 60 including the flexible hollow body 601 is arranged within a height range of L below the top of the tower 10. L is about ½ to ¾ of a height of the tower. In a steep environment of a mountain, L is about ⅔ of the height of the tower.

A purpose of definition "flexible" herein is to ensure that when an upwind incoming flow blows to the flexible hollow body 601, the flexible hollow body 601 may be deformed under an action of a wind force, and a volume of the flexible hollow body 601 changes. An inside of the flexible hollow body 601 may be filled with gas or other fluids, such as water or oil. The present application is described hereinafter by taking an example that the inside of the flexible hollow body 601 is filled with gas, and the principle is the same in a case that the inside of the flexible hollow body 601 is filled with another fluid.

Figure 3:
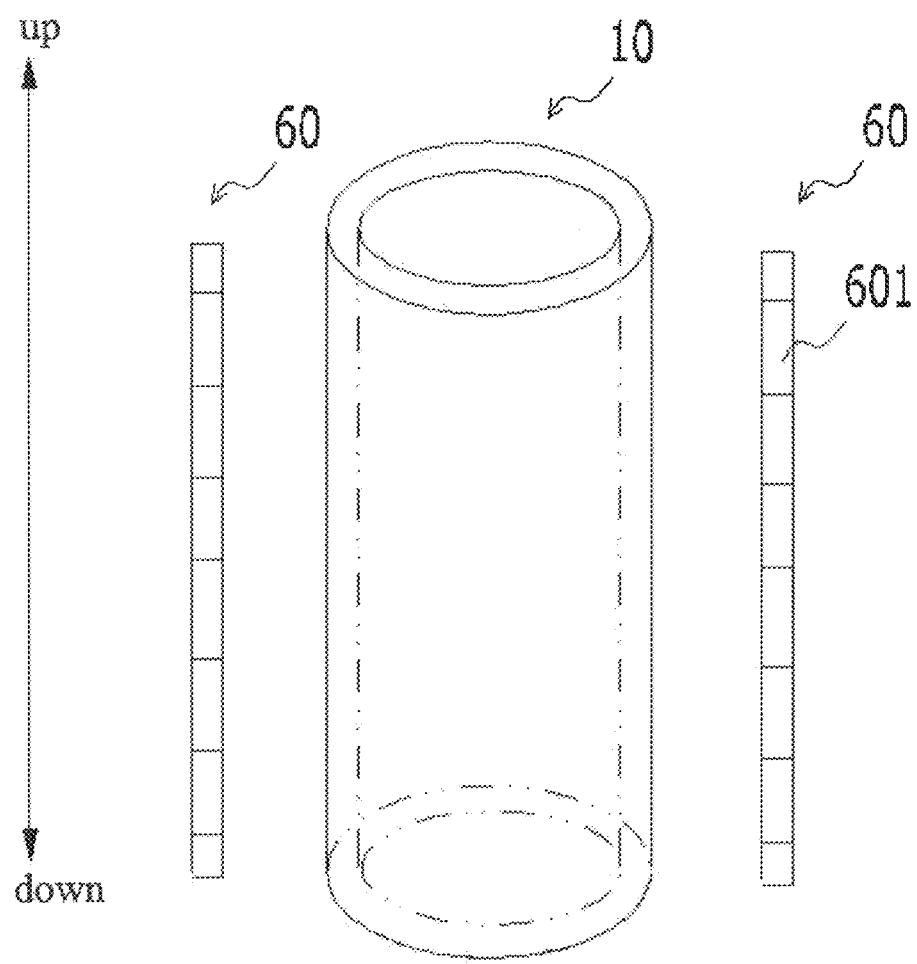
FIG. 3 is a schematic view showing a tower section on which the frequency mixing and absorbing device in FIG. 2 is arranged.
Figure 4:
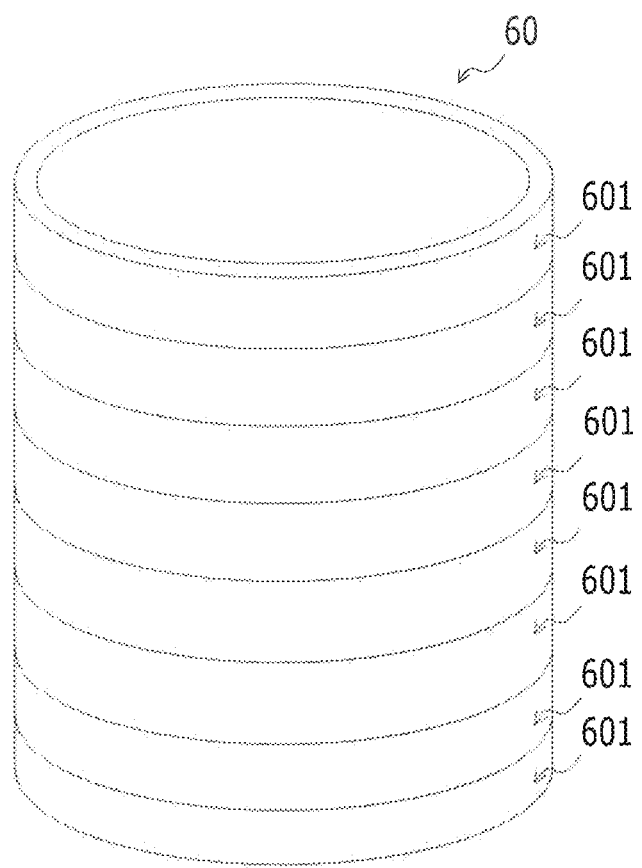
FIG. 4 is a schematic view showing the frequency mixing and absorbing device in FIG. 2.

Reference is made to FIG. 3, which is a schematic view showing a tower section on which the frequency mixing and absorbing device in FIG. 2 is arranged, in addition, the frequency mixing and absorbing device 60 on the outer surface of this section of the tower 10 and the tower section are shown separately; to provide clearer understanding of the structure of the frequency mixing and absorbing device 60. FIG. 3 shows the frequency mixing and absorbing devices at two sides of the tower 10 in a front view. It should be noted that, the frequency mixing and absorbing device 60 in this embodiment is actually an annular structure surrounding the tower 10. Reference is made to FIG. 4, which is a schematic view showing the frequency mixing and absorbing device 60 in FIG. 2.

In this embodiment, the frequency mixing and absorbing device 60 includes multiple flexible hollow bodies 601, each of the flexible hollow bodies 601 surrounds the tower 10 in an annular shape, and is circumferentially unblocked. The multiple flexible hollow bodies 601 are connected in a height direction, which is equivalent to that a large annular hollow body is divided into multiple small annular flexible hollow bodies 601 by annular separating portions. The above arrangement facilitates improvement of reliability and safety in transportation and operation. In a ease that one small annular flexible hollow body 601 is punctured or fails, other smaller annular flexible hollow bodies 601 will not fail, and may still function properly.

In a case that a wind direction of the upwind incoming flow is from left to right, the wind force acts on the flexible hollow body 601 at a windward side, which complies with the ideal gas state equation: PV=mRT, that is, a pressure change will be transferred into a volume change of the flexible hollow body 601 (this is the reason for constructing the "flexible" hollow body and taking the advantage of the hollow body). In this way, fluctuating energy in the upwind incoming flow may be absorbed and stored by the gas inside the flexible hollow body 601, disordering of the fluctuating energy is realized, and the fluctuating energy can be transferred to the volume change. During a process that the volume change of the flexible body is transferred downstream, the wind force does not directly strike the outer surface of the tower 10, instead, the fluctuating energy is consumed and submerged. Therefore, with the arrangement of the flexible hollow body 601, the fluctuating excitation (that is, turbulent energy) can be self-consumed and submerged, the downwind resistance is reduced, the downwind vibration is suppressed, and thereby ensuring the stability and safety of the tower 10 during a hoisting process or an operating process after hoisting. That is, the flexible hollow body 601 is arranged actually to perform frequency mixing, absorption and homogenization to the harmonic fluctuating energy, the fluctuating momentum, and the fluctuating impulse generated by a wind speed change of the upwind incoming flow. The fluid (gas or liquid) itself absorbs the upstream energy during transferring the energy, and the remaining energy after absorption is transferred to the surface of the solid (enclosure) which is in contact with the fluid. In this case, the surface of the enclosure obtains the energy of the upwind incoming flow which is weakened by absorption, and after the fast or slow fluctuating frequency of the airflow of the upwind incoming flow is absorbed by the flexible hollow body; the amplitude and frequency of the overall fluctuation are greatly weakened, so it is called frequency mixing, and the fluctuating frequency of the airflow after frequency mixing is greatly reduced.

It should be noted that, in a case that the inside of the flexible hollow body 601 is filled with liquid such as water or oil, when a local pressure on the outer surface of the flexible hollow body 601 changes, a fluid space apart from a pressurized area inside the hollow body receives the fluctuating pressure changes transmitted by a pressurized surface. Since the fluid has a mass and obvious fluidity; it is easy to diffuse, transfer, consume, absorb, homogenize, weaken the fluctuating pressure or eliminate momentum directionality. A same function as the above-mentioned flexible hollow body 601 which is filled with the gas may be achieved, that is, a pressure difference between the windward side and a leeward side of the tower type enclosure can also be eliminated or weakened, thereby suppressing the downwind vibration.

It should be understood that, this embodiment in which the flexible hollow body 601 is arranged on the outer surface of the tower 10 can be applied not only to the hoisting process of the tower 10 or after hoisting, to improve influence of the wind condition on the operation, but also to situations of the other flow fields. For example, for an offshore building which may be washed against by seawater, in a case that the flexible hollow body 601 is arranged on an outer surface of an underwater portion of the offshore building, the fluctuating energy of the water flow acting on a windward side of the offshore building may also be transferred to two sides of the windward side and even to a rear of the windward side, the principle is the same as the above embodiment. The offshore building may be a lighthouse or lookout at sea, a pier for a cross-sea bridge, an offshore barrage or dam, etc., and may also be a wind turbine foundation of an offshore wind turbine which is located below sea level and extends and penetrates into the silt of the sea bed. In addition to an enclosure built on the sea (i.e., the offshore building), other building-on-water type enclosures in rivers and lakes having underwater building portions, the buildings on the water have at least underwater portions, and the above-mentioned frequency mixing and absorbing devices may be mounted in the underwater portions of the enclosures. The principle is the same as the above principle and will not be described again.

In addition to the buildings on the water, the enclosure may also be a columnar pier or a pillar on land. For example, bridges for roads or railways between large canyons may be provided with columnar piers or columnar pillars on land. Piers or pillars on land are in wind flow fields and face vibration problems. In this case, the above-mentioned frequency mixing and absorbing device may also be arranged to achieve the purpose of drag reduction and vibration reduction.

Figure 5:
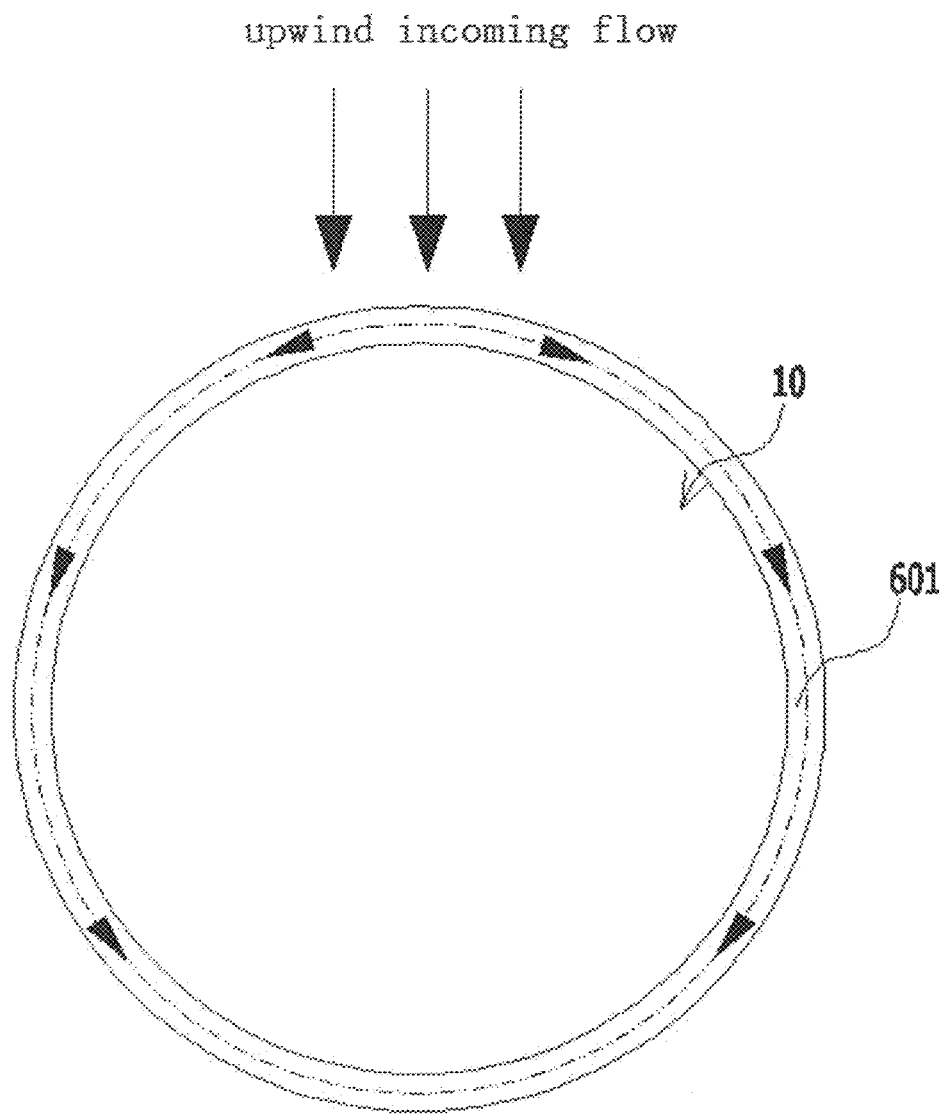
FIG. 5 is a top view showing the tower provided with the frequency mixing and absorbing device.

Reference is made to FIG. 5, which is a top view showing the tower 10 provided with the frequency mixing and absorbing device 60.

In a case that the flexible hollow body 601 is designed in an annular shape, it is pressed by the wind at a position of the windward side, and the gas inside the flexible hollow body 601 at this position (the direction of the gas inside the flexible hollow body 601 in FIG. 5 is shown by a broken line) moves to the two sides downstream the windward side to the rear, that is, the fluctuating energy is transferred by 180 degrees, which is equivalent to "expel" the gas inside the flexible hollow body 601 at the windward side downstream to reach the rear, at this time, a travel distance of the gas in the flexible hollow body 601 is long, and the energy consumption of the upwind incoming flow is more obvious. Moreover, since the gas may move to the rear, that is, the leeward side, a pressure of the leeward surface increases, and a part of a pressure on the windward side is transferred to the leeward side, so as to reduce a pressure difference between the windward side and the leeward side of the tower 10, and thereby effectively suppressing the downwind vibration. The annular flexible hollow body 601 may be horizontally arranged or may have a certain inclination angle, which is not limited in this embodiment.

It should be understood that, the embodiment in which the flexible hollow body 601 is annularly arranged is taken as a preferred embodiment herein. However, from the principle of consuming the fluctuating energy by the volume change, it is only required that the flexible hollow body 601 is arranged on the outer surface of the tower 10, the volume of the flexible hollow body 601 can be changed under the action of the wind force to realize the gas transfer inside the flexible hollow body 601 (the pressure is homogenized), and the fluctuating energy of the upwind incoming flow is transferred and consumed. Therefore, the flexible hollow body 601 is not limited to the annular shape.

Figure 6:
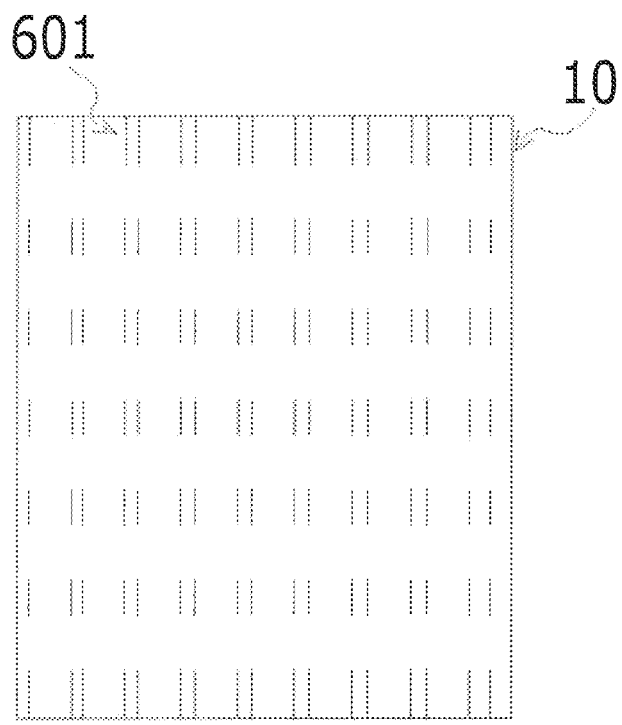
FIG. 6 is a developed schematic view showing a flexible hollow body which is unblocked in a height direction is arranged on an outer surface of the tower.

Reference is made to FIG. 6, FIG. 6 is a developed schematic view showing a strip-shaped hollow body which is unblocked in the height direction is arranged on an outer surface of the tower 10, and only a developed part is shown.

Due to a difference in height, wind speeds and airflow density and the like of the upwind incoming flow are not uniform in the height direction. Therefore, pressures of the upwind incoming flow acting on the outer surface of the tower 10 at a same time are not uniform in upper and lower portions. By providing a strip-shaped hollow body extending in the height direction, and the strip-shaped hollow body is formed by one flexible hollow body 601 unblocked in the height direction or by multiple independent flexible hollow bodies 601 connected in an up-and-down direction, forces in the up-and-down direction may be balanced, thereby achieving the purpose of reducing the downwind resistance. For example, the top of the tower 10 is subjected to a greater pressure, and the wind resistance is also greater. When the flexible hollow body 601 is subjected to wind force to change the volume, the fluctuating energy at the top of the tower 10 is transferred to a lower portion, and the pressure at the top is reduced. In a process of transferring the fluctuating energy, the energy is also lost, thereby reducing the downwind resistance in the entire height direction and suppressing the downwind vibration, that is, the pressure is also homogenized. The flexible hollow body 601 which is unblocked in the up-and-down direction may be orthogonal to the upwind incoming flow, to maximize the consumption of the fluctuating energy, or the flexible hollow body 601 may have a certain inclination angle.

Figure 7:
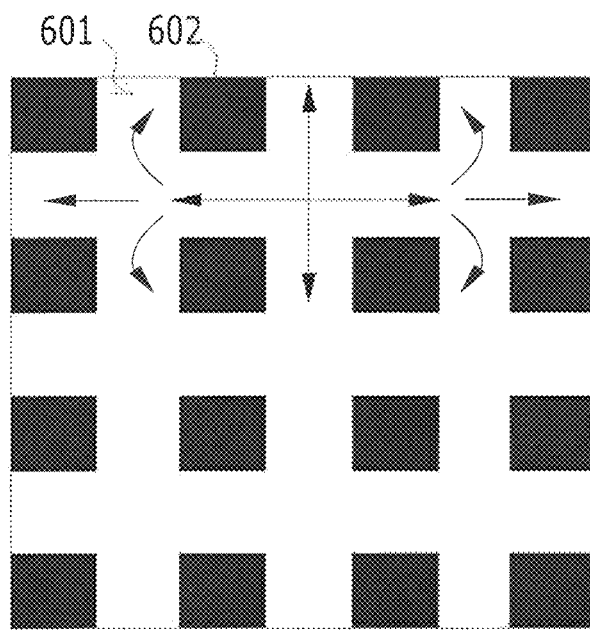
FIG. 7 is a circumferentially developed schematic view showing that a grid-like flexible hollow body is arranged on the outer surface of the tower.

Reference is made to FIG. 7, FIG. 7 is a circumferentially developed schematic view showing that a grid-like flexible hollow body 601 is arranged on the outer surface of the tower 10, and only a part is shown.

In this embodiment, the flexible hollow body 601 is in a grid shape, that is, the flexible hollow body 601 is crisscrossed. In FIG. 7, in order to facilitate the illustration of the flexible hollow body 601, the flexible hollow body 601 and a background portion are distinguishingly shown in white and black, where white indicates the flexible hollow body 601. A lateral grid portion and a longitudinal grid portion of the flexible hollow body 601 are in communication with each other, a longitudinal direction is the height direction, and a lateral direction is a horizontal direction. In this way when the upwind incoming flow acts on the windward side, the airflow of the flexible hollow body 601 at a corresponding position can move in both the longitudinal and lateral directions, as shown by arrows in FIG. 7, moving directions are diversified, and the fluctuating energy of upwind incoming flow may also be consumed, which reduces the downwind resistance, and thereby suppressing the downwind vibration.

It should be understood that, in a case that the flexible hollow body is arranged in a crisscross manner, the lateral grid may also not be in communication with the longitudinal grid, that is, intersection positions of the crisscrossed flexible hollow body 601 may not be in communication with each other, and a moving range of the airflow is limited in this case. Or, the lateral grid and the longitudinal grid may not be in a same plane. For example, an annular flexible hollow body 601 which is laterally unblocked may be arranged on the outer surface of the tower 10, and a strip-shaped flexible hollow body 601 which is longitudinally unblocked may further be arranged on an outer surface of the annular flexible hollow body 601.

Figure 8:
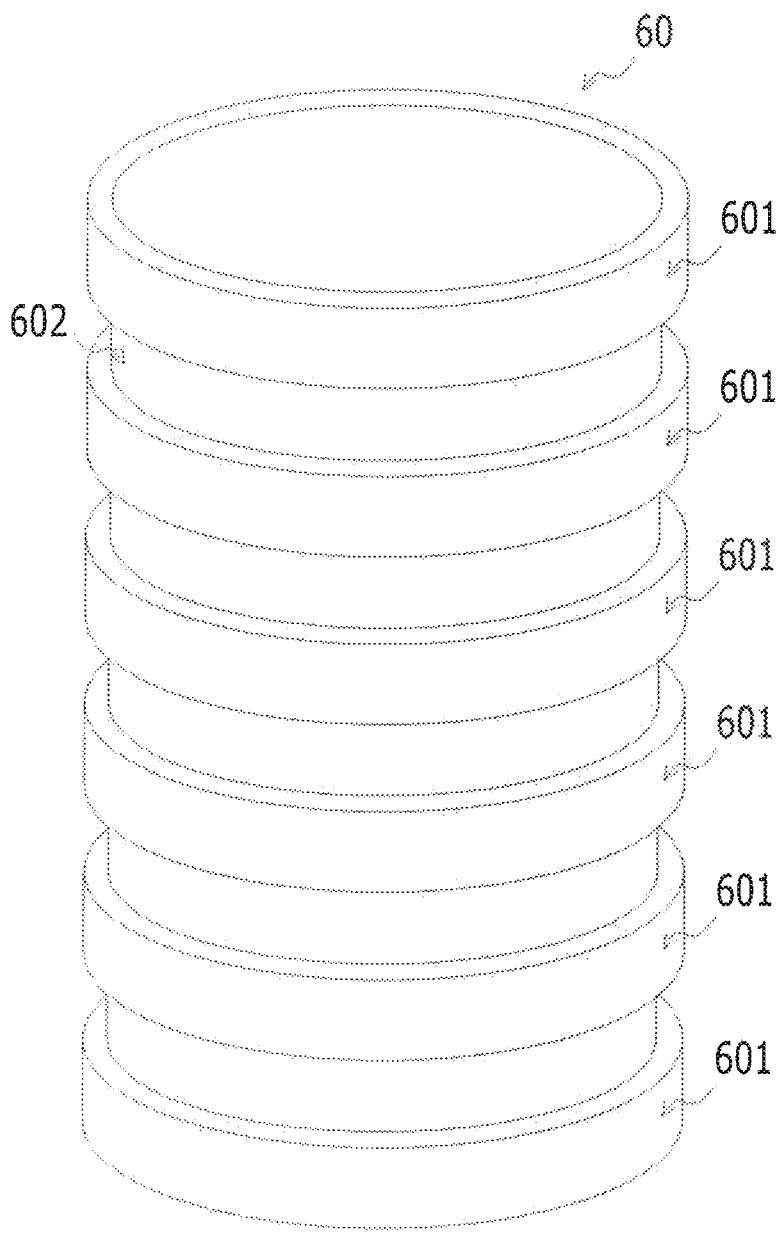
FIG. 8 is a schematic view showing that annular flexible hollow bodies are arranged at intervals in an up-and-down direction.

Here, the annular flexible hollow bodies 601 may be connected in the up-and-down direction as shown in FIG. 4, or the annular flexible hollow bodies 601 may be arranged at intervals in the up-and-down direction, as shown in FIG. 8, which is a schematic view showing that the annular flexible hollow bodies 601 are arranged at intervals in the up-and-down direction. In addition, each of annular hollow bodies may be formed by one annular flexible hollow body 601, but formation of the annular hollow body is not limited to this, for example, the annular hollow body may also be formed by connecting multiple flexible hollow bodies 601 distributed in the circumferential direction. Similarly, the flexible hollow bodies 601 which are longitudinally unblocked may be connected in a left-and-right direction or arranged at intervals in the left-and-right direction. Each of longitudinally unblocked hollow bodies may be formed by one unblocked flexible hollow body 601, but formation of the longitudinally unblocked hollow body is not limited to this, for example, the longitudinally unblocked hollow body may be formed by connecting multiple flexible hollow bodies 601 distributed in the height direction.

Figure 9:
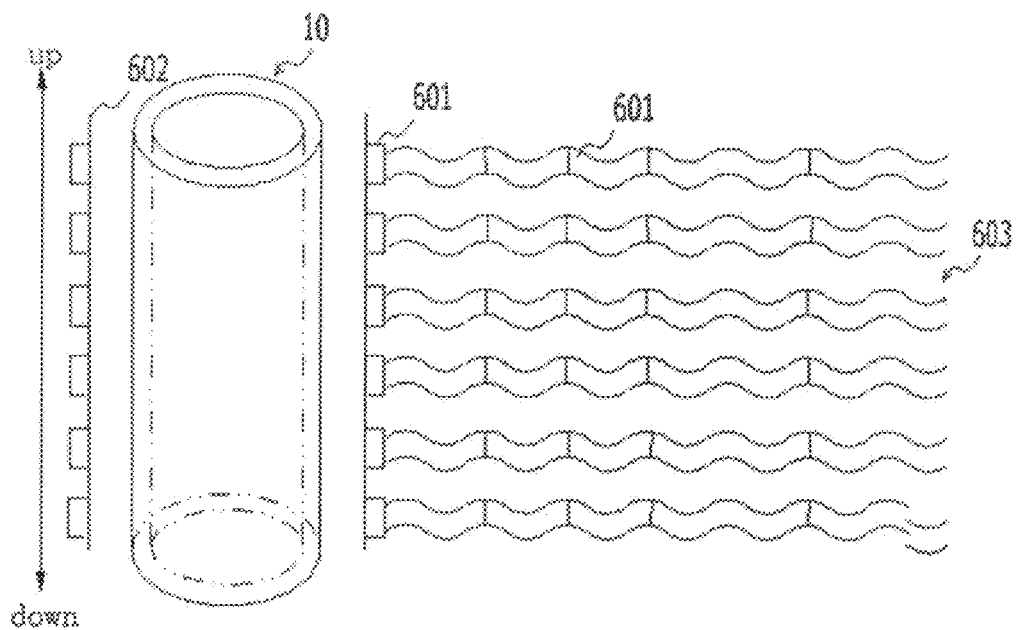
FIG. 9 is a schematic view showing that a wave-shaped flexible hollow body is arranged on the outer surface of the tower.

With continued reference to FIG. 9, FIG. 9 is a schematic view showing that a wave-shaped flexible hollow body 601 is arranged on the outer surface of the tower 10, and a circumferential developed schematic view showing the wave-shaped flexible hollow body 601 is shown at a right side.

In this embodiment, the frequency mixing and absorbing device 60 includes multiple annular hollow bodies surrounding the tower 10, and each of the annular hollow bodies is formed by the flexible hollow body 601. The annular hollow body may be an unblocked flexible hollow body 601, that is, the flexible hollow body 601 itself is of an annular shape, or, the annular hollow body is formed by connecting multiple adjacent and independent arc-shaped flexible hollow bodies 601. As shown in FIG. 9, the annular hollow body is formed by connecting multiple flexible hollow bodies 601.

Moreover, the adjacent upper and lower annular hollow bodies are arranged at intervals, and each of the annular hollow bodies is arranged in a wave shape. In this way, a wave-shaped annular slot 603 is formed between the adjacent upper and lower annular hollow bodies (the annular hollow bodies protrude outward with respect to the annular slot 603). An interfacial structure of a wave shape can motivate and induce a fluid vibration in the annular slot 603. This basic vibration induces a harmonic vibration of a higher level in an airflow boundary layer in the annular slot 603, which can motivate the flowing of the fluid to transition in advance, so that the momentum is higher, to suppress a backflow phenomenon of the bypassing flow detachment under an adverse pressure gradient, then the boundary layer is restrained or prevented from being separated from the outer surface of the tower 10, and thereby further suppressing lateral vortex-induced vibration. That is, with the arrangement of the annular hollow bodies in the wave shape according to this embodiment, the lateral and downwind vibrations can be suppressed at the same time.

In the above embodiment, a grid-like flexible hollow body 601, an annular hollow body (formed by one flexible hollow body 601 or by connecting multiple flexible hollow bodies 601) or a vertically unblocked hollow body (formed by one flexible hollow body 601 or by connecting multiple flexible hollow bodies 601) are taken as examples.

Figure 10:
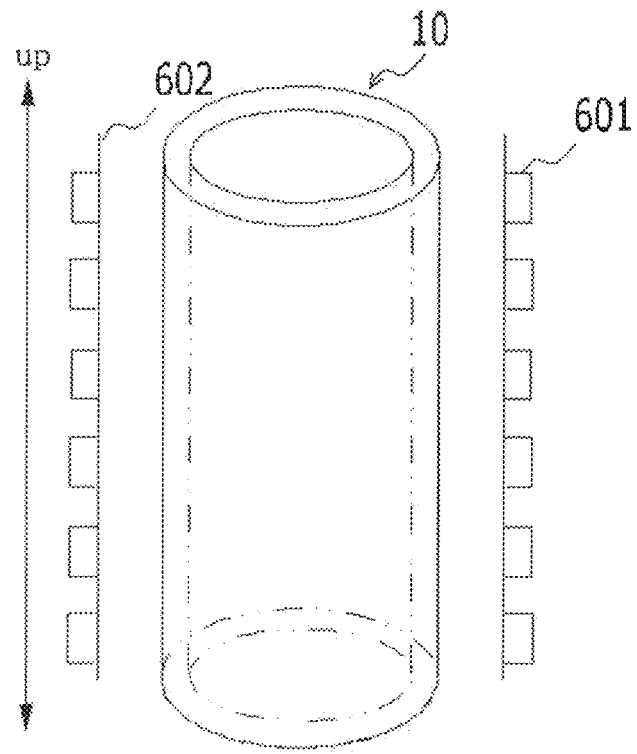
FIG. 10 is a schematic view showing a first type of structure of the frequency mixing and absorbing device on the outer surface of the tower including multiple flexible hollow bodies arranged in a dispersed manner.
Figure 11:
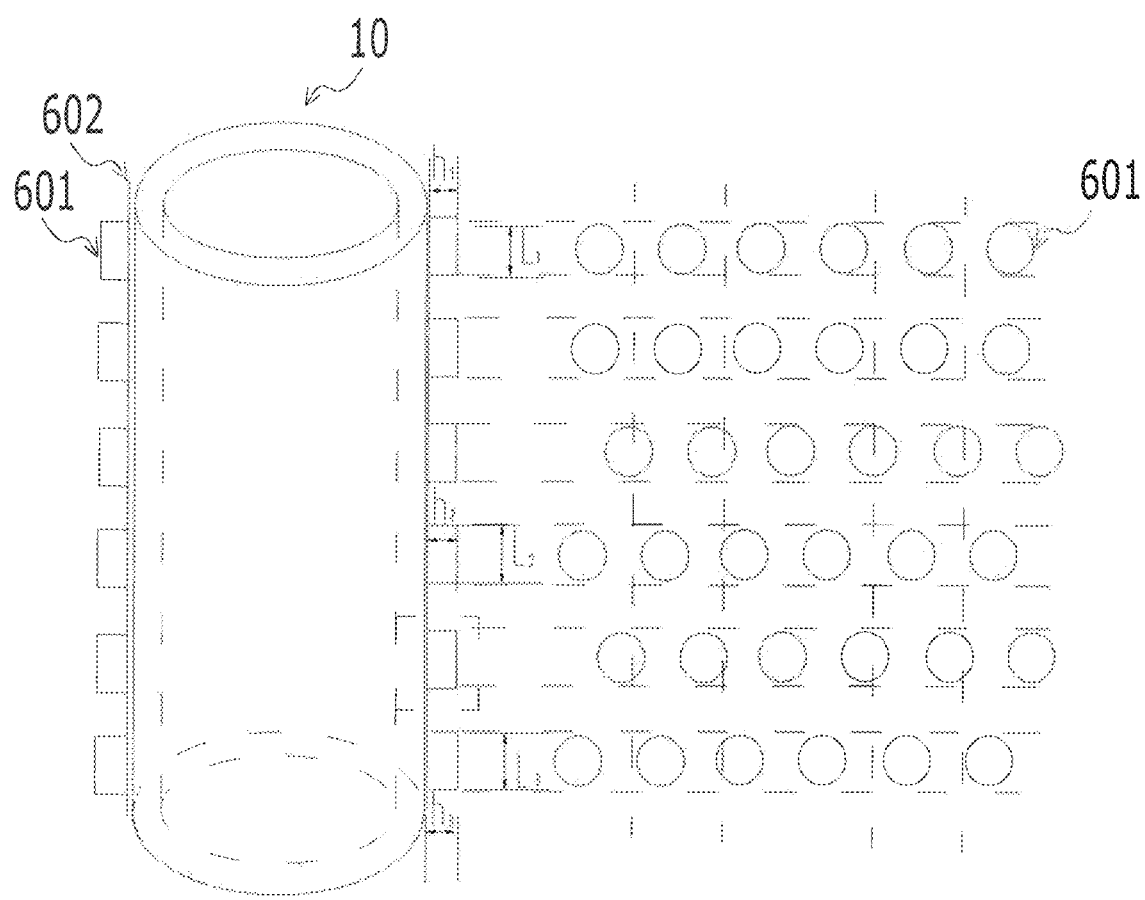
FIG. 11 is a circumferentially developed schematic view showing the frequency mixing and absorbing device in FIG. 10.

With continued reference to FIGS. 10 and 11, FIG. 10 is a schematic view showing a first type of structure of the frequency mixing and absorbing device 60 on the outer surface of the tower 10 including multiple flexible hollow bodies arranged in a dispersed manner; and FIG. 11 is a circumferentially developed schematic view showing the frequency mixing and absorbing device 60 in FIG. 10.

In this embodiment, the frequency mixing and absorbing device 60 includes multiple flexible hollow bodies 601, and the flexible hollow bodies 601 are distributed at intervals both in the height direction and the circumferential direction. That is, the multiple flexible hollow bodies 601 are arranged on the outer surface of the tower 10 in a dispersed manner, and a plurality of protrusions are formed on the outer surface of tower 10. The principle of reducing the downwind vibration by this arrangement is the same as that of the above solution, the fluctuating energy of upwind incoming flow is transferred, absorbed, consumed and dispersed through the volume change, and thereby reducing the downward resistance.

As shown in FIG. 11, the frequency mixing and absorbing device 60 includes multiple rows of flexible hollow bodies 601, each row of the flexible hollow bodies 601 is arranged to surround the tower 10. Two adjacent upper and lower rows of the flexible hollow bodies 601 are in a staggered arrangement. With the staggered arrangement, when the airflow passes by the two adjacent upper and lower rows of the flexible hollow bodies 601, since the positions of the flexible hollow bodies 601 are staggered, situations of disturbance of the airflow is not uniform, which disrupts correlation between upper and lower parts, prevents vortices of the airflow from shedding uniformly from the two sides of the windward side of the tower 10, and thereby suppressing the lateral vortex-induced vibration. Moreover, each row includes multiple flexible hollow bodies 601, during a process of moving to the two sides of the windward side and to the rear, the airflow is "split and then converged" by the flexible hollow bodies 601 for several times, thereby preventing formation of boundary layers at the two sides of the tower 10, and fundamentally suppressing a cause of formation of the lateral vortex-induced vibration.

Figure 12:
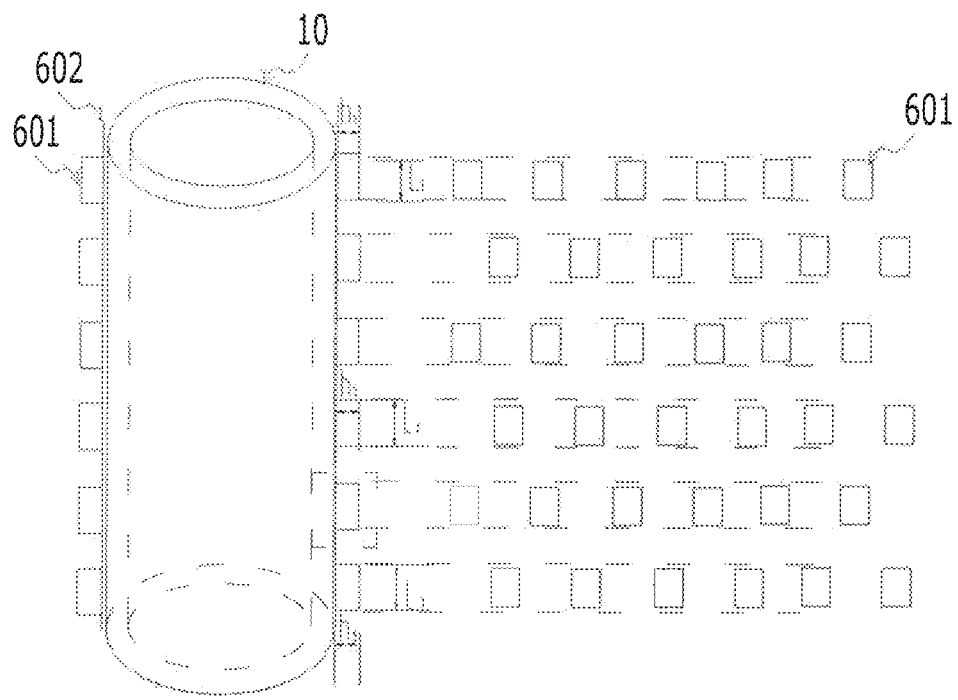
FIG. 12 is a schematic view showing a second type of structure of the frequency mixing and absorbing device on the outer surface of the tower including multiple flexible hollow bodies arranged in a dispersed manner.
Figure 13:
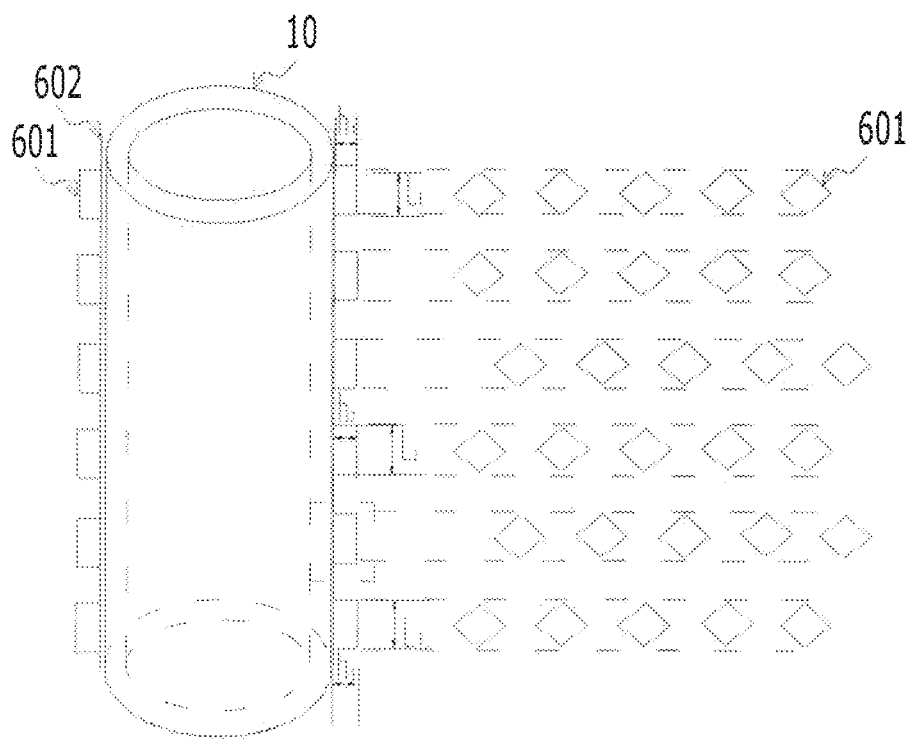
FIG. 13 is a schematic view showing a third type of structure of the frequency mixing and absorbing device on the outer surface of the tower including multiple flexible hollow bodies arranged in a dispersed manner.

With continued reference to FIGS. 12 and 13, FIG. 12 is a schematic view showing a second type of structure of the frequency mixing and absorbing device 60 on the outer surface of the tower 10 including multiple flexible hollow bodies arranged in a dispersed manner; and FIG. 13 is a schematic view showing a third type of structure of the frequency mixing and absorbing device 60 on the outer surface of the tower 10 including multiple flexible hollow bodies arranged in a dispersed manner.

FIGS. 12 and 13 are similar to FIG. 11 in structure, except that a single flexible hollow body 601 in FIG. 11 is a column-like body having a cross-section of a circular shape, a flexible hollow body 601 according to an embodiment in FIG. 12 is a column-like body having a cross-section of a rectangular shape, and a flexible hollow body 601 according to an embodiment in FIG. 13 is a column-like body having a cross-section of a rhombic shape. Herein, the circular shape, the rectangular shape and the rhombic shape are the shapes of projections of the flexible hollow bodies 601 on the outer surface of the tower 10. It should be understood that, the shape of the flexible hollow body 601 is not limited in particular, as long as a volume of the flexible hollow body 60 can be changed under the action of the wind force, to allow the airflow inside the flexible hollow body 601 to be transferred to consume the fluctuating energy. It should be noted that, when the airflow passes by the rhombic flexible hollow body 601, due to shape features of side walls of the rhombic shape, the airflow is split more obviously, and the boundary layer is cut off more completely.

Further, in a case that the multiple flexible hollow bodies 601 are arranged at intervals both in the height direction and the circumferential direction of the tower 10 to be dispersed on the outer surface of the tower 10, sizes of the multiple flexible hollow bodies 601 may be designed to be different. In the height direction, the frequency mixing and absorbing device 60 may be divided into multiple sections. As shown in FIGS. 11 to 13, there are three different sections, namely a first section, a second section, and a third section in sequence from top to bottom. Wherein, flexible hollow bodies 601 distributed in the first section has a height L1 and a thickness flexible hollow bodies 601 distributed in the second section has a height L2 and a thickness 112; and flexible hollow bodies 601 distributed in the third section has a height L3 and a thickness h3. In this way, sizes of the flexible hollow bodies 601 in different sections in the height direction are not the same, which further disrupts the correlation, relevance, and consistency between the upper and lower parts, and thereby suppressing the lateral vortex-induced vibration.

Figure 14:
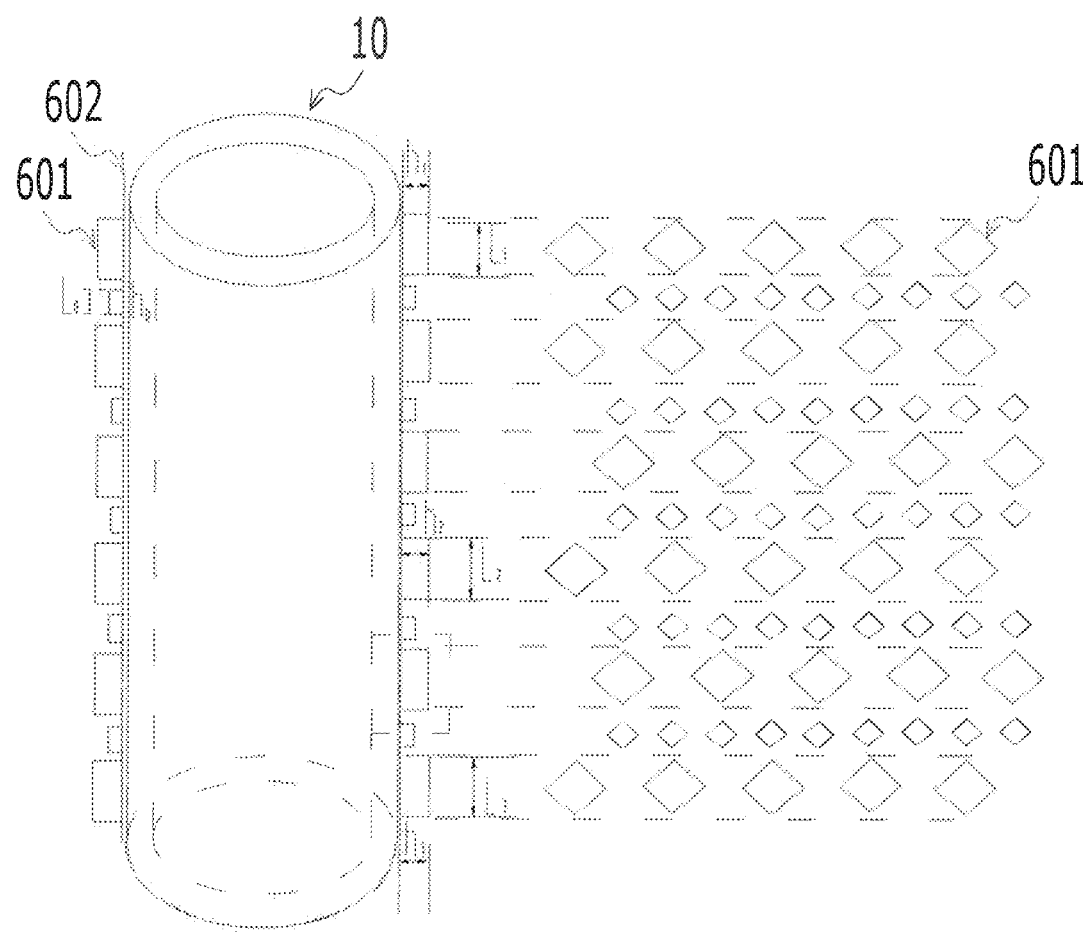
FIG. 14 is a schematic view showing a fourth type of structure of the frequency mixing and absorbing device on the outer surface of the tower including multiple flexible hollow bodies arranged in a dispersed manner.

With further reference to FIG. 14, FIG. 14 is a schematic view showing a fourth type of structure of the frequency mixing and absorbing device 60 on the outer surface of the tower 10 including multiple flexible hollow bodies 601 arranged in a dispersed manner. In this embodiment, each of the flexible hollow bodies 601 is also a column-like body having a rhombic shape, there are also multiple sections in the height direction, sizes of the flexible hollow bodies 601 in different sections are different, and at least sizes of the flexible hollow bodies 601 in adjacent sections are different.

However, according to an embodiment in FIG. 14, in a same section of the frequency mixing and absorbing device 60, an intermediate row of flexible hollow bodies 601 is arranged between each two adjacent upper and lower rows of flexible hollow bodies 601. Each of the flexible hollow bodies 601 of the intermediate row has a volume smaller than a volume of each of the flexible hollow bodies 601 of the adjacent upper and lower rows, and is defined as small flexible hollow body 601", and the volume of the flexible hollow body 601 of the intermediate row is also smaller than a volume of each of the flexible hollow bodies 601 in other sections. Moreover, the flexible hollow body 601 of the intermediate row may be located right between a flexible hollow body 601 of the upper row and a corresponding flexible hollow body 601 of the adjacent lower row, or the flexible hollow body 601 of the intermediate row directly faces one of the flexible hollow bodies 601 of the adjacent upper and lower rows.

As shown in FIG. 14, normally, a large gap may be left between the upper row and the lower row. In this case, the arrangement of the intermediate row small flexible hollow bodies 601 facilitates disturbing of the airflow at a position of the gap, and thereby facilitating transition of the airflow to turbulent airflow. In a case that the flexible hollow body 601 of the intermediate row is located right between the flexible hollow body 601 of the upper row and the corresponding flexible hollow body 601 of the adjacent lower row, an accelerating passage is formed between the flexible hollow body 601 of the upper row and the corresponding flexible hollow body 601 of the adjacent lower row, and a "blowing" function is generated. Especially in a case that the flexible hollow bodies 601 are rhombus-shaped, a typical convergent-divergent passage may be formed, which is more conducive for the formation of the turbulent airflow, and thereby avoiding the lateral vortex-induced vibration due to the consistency of the vortex shedding.

Figure 15:
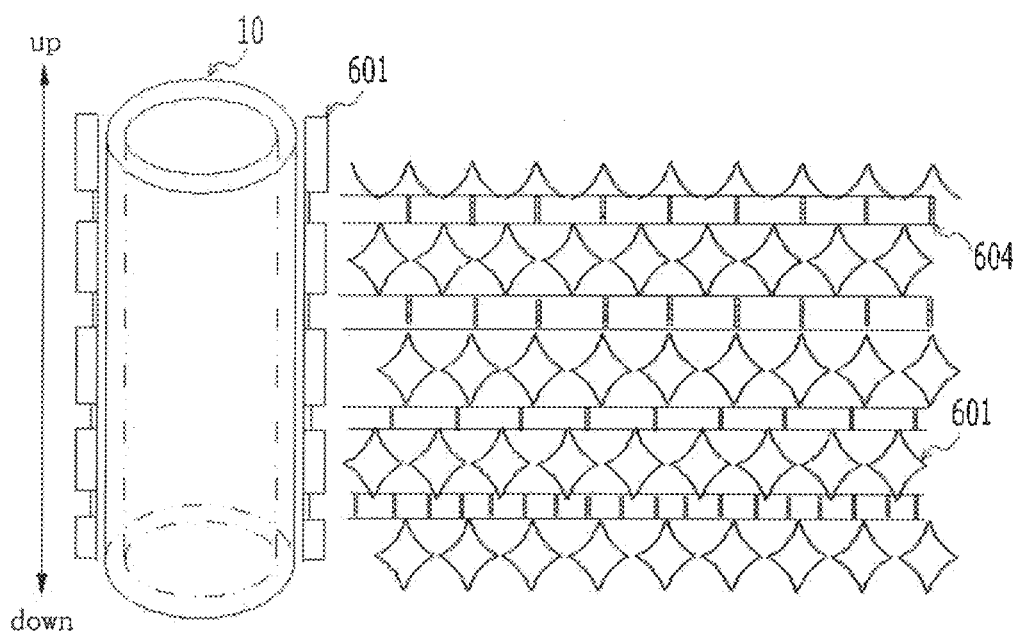
FIG. 15 is a schematic view showing a fifth type of structure of the frequency mixing and absorbing device on the outer surface of the tower including multiple flexible hollow bodies arranged in a dispersed manner.

With continued reference to FIG. 15, FIG. 15 is a schematic view showing a fifth type of structure of the frequency mixing and absorbing device 60 on the outer surface of the tower 10 including multiple flexible hollow bodies 601 arranged in a dispersed manner. In this embodiment, a projection of each of the flexible hollow bodies 601 on the outer surface of the tower 10 is of a rhombic shape, which is a concave rhombic shape, that is, the flexible hollow body 601 has a rhombic column-like structure of which all four side walls are concaved. Similarly, in this embodiment, multiple rows of flexible hollow bodies 601 are arranged, and multiple flexible hollow bodies 601 of each row are arranged to circumferentially surround the tower 10.

As shown in FIG. 15, since each of the flexible hollow bodies 601 is a hollow body structure protruding with respect to the outer surface of the tower 10, when the upwind incoming flow flows around the tower 10, in addition to acting on the flexible hollow body 601 to allow the airflow inside the flexible hollow body 601 to move, the airflow of the upwind incoming flow is also guided by the concave side walls of the rhombic flexible hollow body 601, that is, a portion of the airflow may flow upward or downward along the concave side walls. In this way, a portion of fluctuating energy may be consumed. Moreover, airflows which are guided upward and downward may collide with each other due to opposite directions, and the fluctuating energy is further consumed. In addition to reducing the downwind resistance and reducing the downwind vibration, correspondingly, since airflow vortices may be generated due to the collision, rotational momentum of a part of the vortices to all the vortices on the outer surface of the enclosure is increased, and a viscous force of the boundary layer is enhanced, to prevent and restrain the vortices from shedding from the two sides or the leeward side of the tower 10 too early, and thereby achieving the purpose of suppressing the vortex-induced vibration. The concave rhombic shape makes it easier to guide vortices with certain momentum by using its concave arc-shaped side walls. Of course, the side walls of the rhombic shape may also be straight.

Preferably, adjacent upper and lower flexible hollow bodies 601 may be in a staggered arrangement, such that the airflow guided upward and downward by the rhombic flexible hollow bodies 601 is more likely to form vortices, and the rotational momentum of the vortices is increased.

Figure 16:
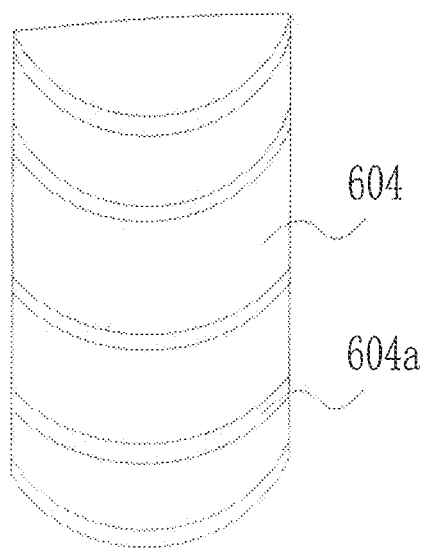
FIG. 16 is a schematic view showing the structure of a flow hindering protrusion in FIG. 15.

In addition, multiple flow hindering protrusions 604 may be arranged between two adjacent rows of flexible hollow bodies 601. As shown in FIG. 16, FIG. 16 is a schematic view showing the structure of a flow hindering protrusion 604 in FIG. 15.

An annular slot 603 is formed between the two adjacent rows of flexible hollow bodies 601, when the upwind incoming flow flows around to the annular slot 603, the flow hindering protrusion 604 can motivate the airflow to form radial surface fluctuation along the tower 10, and the fluctuation is motivated periodically. A fluctuating drive force can cause the transition (the transition of the boundary layer from a laminar flow state to a turbulent flow state) of the boundary layer to occur in advance, to form a turbulent flow, which has a higher momentum to suppress the occurrence of the backflow phenomenon of the bypassing flow detachment under the adverse pressure gradient, to further restrain or prevent the boundary layer from being detached from the surface of the tower 10, thereby suppressing the lateral vortex-induced vibration caused by the bypassing flow detachment.

Further, a cross-section of the flow hindering protrusion 604 is semi-circular, an arc-shaped surface of the flow hindering protrusion 604 faces outward, which can reduce the resistance to the airflow when the airflow passes by, so as to ensure that the formed fluctuation has certain momentum. Furthermore, a plurality of lateral ribs may also be provided on the outer surface of the flow hindering protrusion 604, to allow a structure of a protruding hindering string 604a to be formed on the whole flow hindering protrusion 604, which is similar to a "speed bump" on the road. Thus, a friction of the outer surface of the flow hindering protrusion 604 is increased, and an adhesion force of the boundary layer is increased, and the boundary layer is prevented from being driven by the overall upwind incoming flow, which is favorable for the formation of the radial fluctuation, and the effect is more obvious under the working condition with a high wind speed.

With regard to the above embodiments in which the multiple flexible hollow bodies 601 are arranged at intervals both in the circumferential direction and the height direction, arrangement density of the flexible hollow bodies 601 in the circumferential direction is gradually increased from top to bottom. A size of the tower 10 gradually increases from top to bottom, therefore, the arrangement density in the circumferential direction is increased to ensure that there are enough flexible hollow bodies 601 to correspond to the upwind incoming flow in different directions.

With regard to all the above embodiments in which the multiple flexible hollow bodies 601 are arranged at intervals (including the situations that the flexible hollow bodies 601 are arranged at intervals in the circumferential direction, or arranged at intervals in the height direction, or arranged at intervals in both the circumferential direction and the height direction), the frequency mixing and absorbing device 60 further includes, in addition to the flexible hollow bodies 601, a base body 602 (for example, black portions in FIG. 7 may be the base body 602) capable of surrounding the enclosure, and all flexible hollow bodies 601 distributed at intervals are arranged at the base body 602. In this way, it is convenient to arrange all the flexible hollow bodies 601 on the outer surface of the tower 10. For example, the frequency mixing and absorbing device 60 may be a plastic product provided with the flexible hollow bodies 601, which may be made of a lightweight plastic product, either transparent or non-transparent, for example, an PE and PA film, that is, a composite material formed by PE and PA, which has advantages of convenient processing and low cost, and is favorable for reducing the cost of the whole tower 10. Moreover, in a case that the material is a plastic film, and the embodiments shown in FIGS. 11 to 15 are adopted, that is, the frequency mixing and absorbing device 60 includes multiple column-like flexible hollow bodies 601 which are arranged in a dispersed manner, the formation is easy, and transportation is convenient without occupying too much space of transport vehicles. Of course, the annular flexible hollow body 601, the vertical flexible hollow body 601 or the grid-like structure formed according to FIGS. 4, 6, and 7 are also convenient for the formation and transportation.

In addition, according to the outer surface structure of the tower 10 formed in a case that the multiple flexible hollow bodies 601 are arranged in a dispersed manner, when the upwind incoming flow flows around to pass by positions of the flexible hollow bodies 601, the airflow is disturbed to form upward and downward attack angles, which is equivalent to changing a local aerodynamic configuration (a local aerodynamic configuration is changed at a position of each of the flexible hollow bodies 601), so that the upwind incoming flow may have a certain turbulent strength, and thereby suppressing the vibration, and ensuring the stability and the safety of the hoisting of the tower 10.

It should be noted that, from the perspective of volume change and airflow transfer, it is also a feasible solution that the entire frequency mixing and absorbing device 60 is an annular flexible hollow body 601 surrounding and covering the tower 10, and the airflow movement is more flexible. In terms of facilitating processing and transportation, and avoiding damages, the above dispersed arrangement is more advantageous.

When the base body 602 is disposed, the base body 602 may be adhered to the outer surface of the tower 10 (in a case that the frequency mixing and absorbing device 60 is a complete annular flexible hollow body 601, the base body 602 is actually at an inner side of the flexible hollow body 601), such as adhering by using an double-sided adhesive. Alternatively, the base body 602 is arranged to surround the tower 10 and then is butted at ends to form an annular base body 602, and the butting may be released when the frequency mixing and absorbing device 60 is not required, to detach the frequency mixing and absorbing device 60. In this way, the entire frequency mixing and absorbing device 60 may be reused, which further reduces the cost.

In the above embodiments, at least an upper portion of the tower 10 is provided with the frequency mixing and absorbing device 60, and the upper portion here refers to positions above ½ of a height of a tower-like enclosure. The vibration of the upper portion is more obvious, and a good effect can be obtained by arranging the frequency mixing and absorbing device 60 to suppress the vibration of the upper portion. Of course, the frequency mixing and absorbing device 60 may also be arranged on the entire tower 10.

It should be emphasized that, in the above embodiments, the frequency mixing and absorbing device 60 includes the flexible hollow body 601, and the principle thereof is utilizing a characteristic that the flexible hollow body 601 is deformable to transfer and consume the energy of the incoming flow, Based on this, it is obvious that the frequency mixing and absorbing device 60 includes the flexible hollow body 601, but is not limited to this. The frequency mixing and absorbing device 60 may include other deformable bodies, such as an elastic hollow body. In addition to a deformation function of the flexible hollow body 601, the elastic hollow body further has a rebound function, which is conducive to repeated use, and an effect is better than that of the embodiments of the flexible hollow body 601. Moreover, the above elastic hollow body and the flexible hollow body 601 may be filled with gas or liquid to achieve better deformation. It could be understood that, an elastic solid body or a flexible solid body may also be employed, for they also have the deformation function. Of course, the elastic hollow body and the flexible hollow body 601 are preferred embodiments because they have superior deformation capability, and can better achieve energy transfer, vibration reduction and drag reduction in situations of various incoming flows. The elastic solid body and the flexible solid body also have a good effect in flow fields where flow rates are relatively slow (for example, a water flow field, specifically the offshore buildings mentioned in the application, and other buildings on water, etc.), for example, multiple elastic rubber bodies may be arranged to surround the outer surface of enclosure.

For the sake of brevity, the embodiments of this application are described by taking the flexible hollow body 601 as an example, the elastic hollow body, the elastic solid body, or the flexible solid body may replace the flexible hollow body 501 in all embodiments of the present application, particularly, both the elastic hollow body and the flexible hollow body 601 have a cavity, and the elastic hollow body further has the rebound function. The elastic hollow body, the elastic solid body or the flexible solid body each may be arranged in an annular shape or a vertical strip shape, and may be arranged at intervals, and the elastic hollow body may be arranged to be unblocked or partially blocked in a vertical direction or the circumferential direction, etc., which is consistent with the embodiments of the flexible hollow body 601, and will not be described again hereinafter. Moreover, it is not limited that only one type among the elastic hollow body, the flexible hollow body 601, and the elastic solid body or the flexible solid body is used in the frequency mixing and absorbing device 60, and the above types may be used in combination. For example, an upper portion of the frequency mixing and absorbing device 60 includes an elastic hollow body, and a lower portion of the frequency mixing and absorbing device 60 includes a flexible hollow body 601. Of course, choosing only one type is easier to implement and convenient to process technically.

In a case that the deformable body employs the flexible solid body or elastic solid body, the annular hollow body and the strip-shaped hollow body in the above embodiments may correspondingly be embodied as an annular solid body and a strip-shaped solid body. That is, the annular body and the strip-shaped body may be solid or hollow, which is not described herein. It should be understood that, in a case that the annular body is a hollow body, a fluid is filled inside, and in a case that the annular body is unblocked in the height direction or the circumferential direction, the fluid can flow in a wider range to consume energy. Of course, the annular body may also be divided in the height direction or the circumferential direction (be formed by connecting multiple deformable bodies). In a case that the annular body is a solid body, it cannot be unblocked, and as long as it is connected, the energy consumption and transfer can be achieved.

Figure 17:
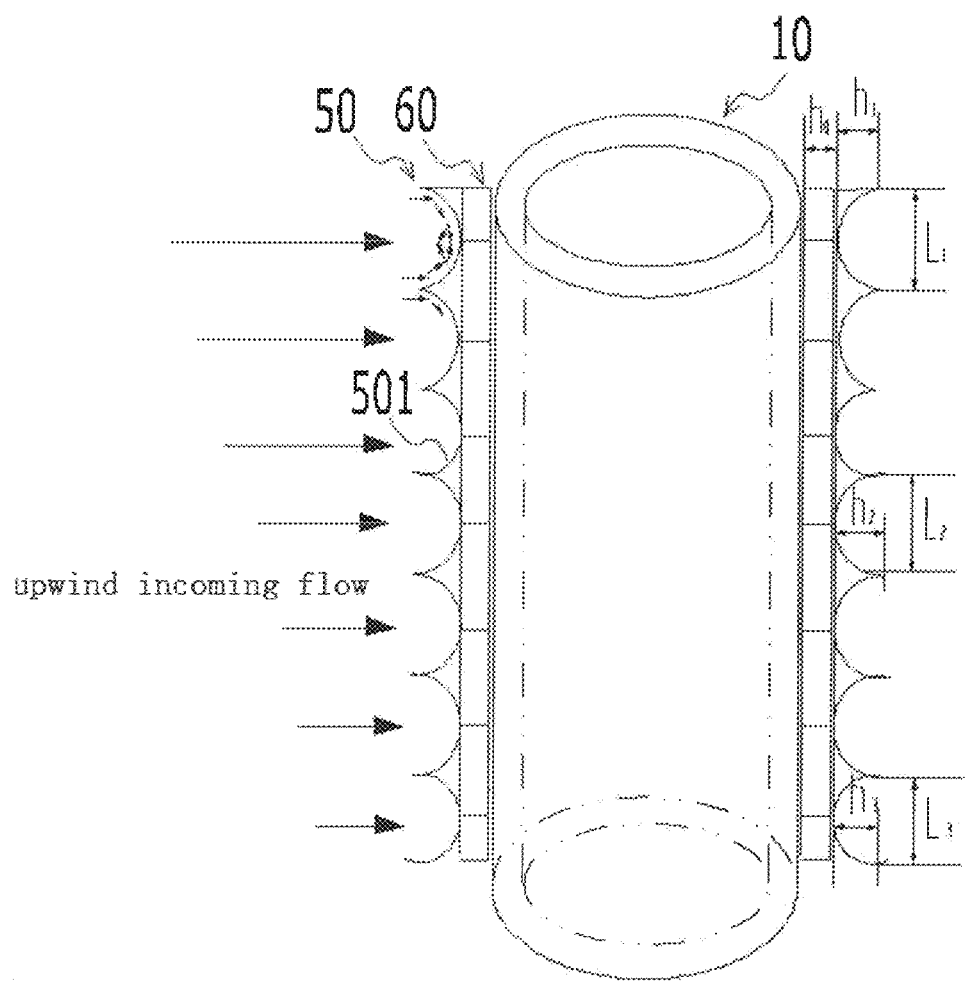
FIG. 17 is a schematic view showing that a drag reducing and absorbing device is arranged on the outer surface of the tower.
Figure 18:
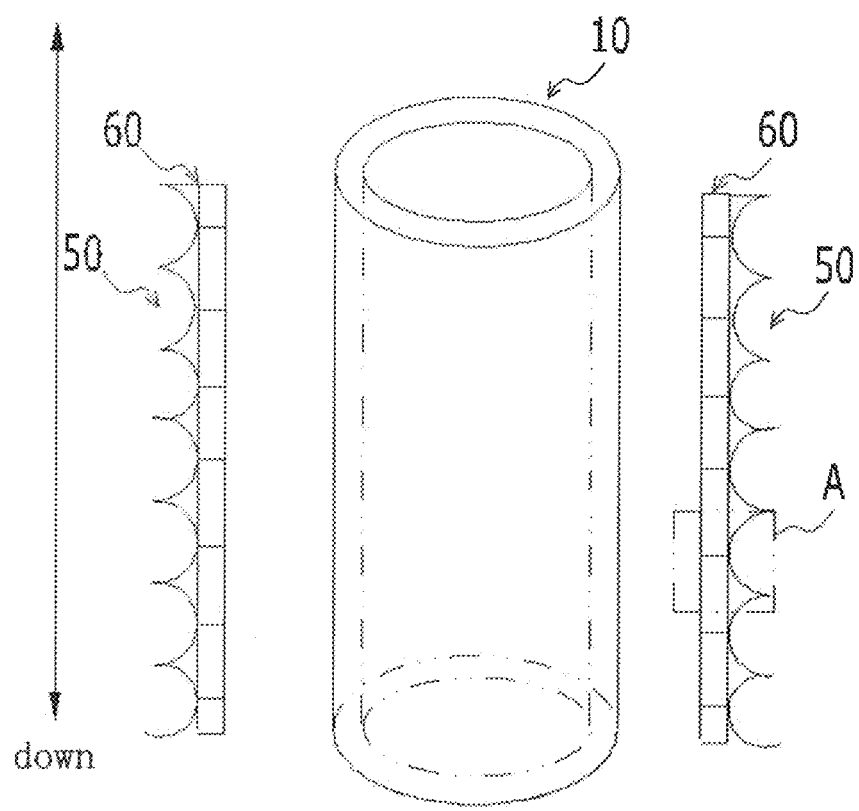
FIG. 18 is a schematic view showing the drag reducing and absorbing device and the tower in FIG. 17 separately.
Figure 19:
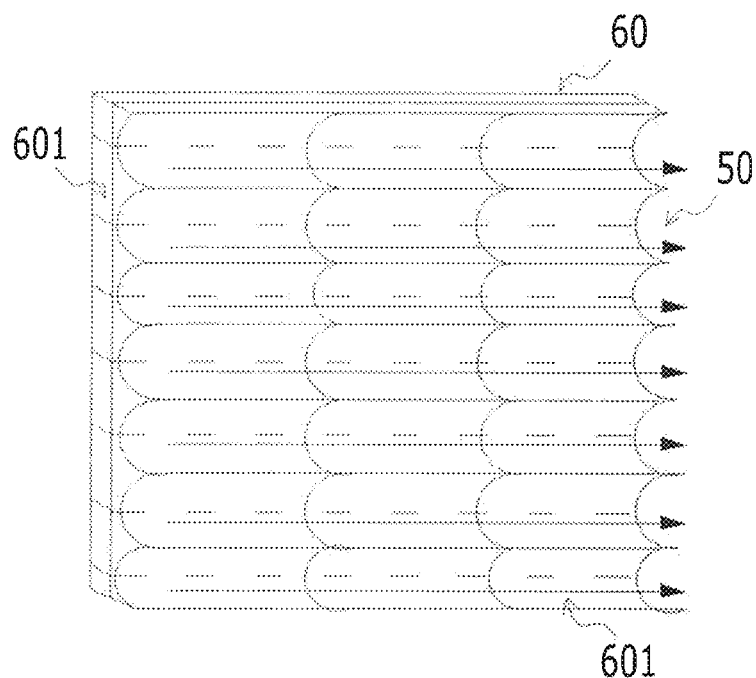
FIG. 19 is a circumferentially developed schematic view showing the drag reducing and absorbing device in FIG. 17.

With reference to FIGS. 17 and 18, FIG. 17 is a schematic view showing that a drag reducing and absorbing device is arranged on the outer surface of the tower 10. To facilitate understanding, FIG. 18 is a schematic view showing the drag reducing and absorbing device and the tower 10 in FIG. 17 separately; and the drag reducing and absorbing device at the two sides of the tower 10 is shown in a front view. It should be understood that, a drag reducing device 50 in this embodiment is of an annular shape. FIG. 19 is a circumferentially developed schematic view showing the drag reducing and absorbing device in FIG. 17 and only a part of the drag reducing and absorbing device is shown.

The drag reducing and absorbing device according to this embodiment includes a frequency mixing and absorbing device 60 and a drag reducing device 50, and the principle of the frequency mixing and absorbing device 60 has been illustrated by the above embodiments.

The drag reducing device 50 includes an annular groove 501 located on the outer surface of the tower 10, as shown in FIG. 17, the drag reducing and absorbing device includes the drag reducing device 50 located at an outer side and the frequency mixing and absorbing device 60 located at an inner side, and the frequency mixing and absorbing device 60 is closer to the outer surface of the tower 10 with respect to the drag reducing device 50. Specifically, the drag reducing device 50 includes a base portion surrounding the tower 10, the annular groove 501 is arranged at an outer side of the base portion, the above frequency mixing and absorbing device 60 is arranged at an inner side of the base portion, and the frequency mixing and absorbing device 60 may be the frequency mixing and absorbing device 60 according to the above embodiments.

A groove wall of the annular groove 501 of the drag reducing device 50 includes an upper groove wall 501*a* located at an upper portion and a lower groove wall 501*b* located at a lower portion, the upper groove wall 501*a* and the lower groove wall 501*b* are inclined toward each other in an arc shape, so that the airflow flowing into the annular groove 501 may be in opposite directions and collide, to reduce the downwind resistance.

Figure 20:
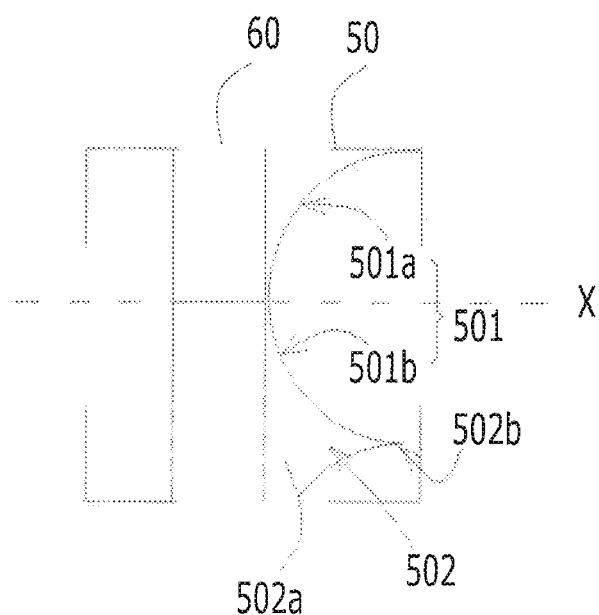
FIG. 20 is a partially enlarged schematic view showing a portion A in FIG. 18.

With continued reference to FIG. 20, FIG. 20 is a partially enlarged schematic view showing a portion A in FIG. 18.

In this solution, the annular groove 501 is an annular groove that circumferentially surrounds the outer surface of the tower 10. Herein, it could be understood by dividing the annular groove 501, and a portion of the annular groove 501 above a center line X of the annular groove 501 (the horizontal center line X shown in FIG. 20) is defined as the upper groove wall 501*a*, and a portion of the annular groove 501 below the center line is defined as the lower groove wall 501*b*. In this case, the upper groove wall 501*a* and the lower groove wall 501*b* are actually inclined toward each other. That is, from left to right, the upper groove wall 501*a* has a downward arc shape, and the lower groove wall 501*b* has an upward arc shape. The purpose of this arrangement may be understood with reference to FIG. 21 in conjunction with FIG. 17.

Figure 21:
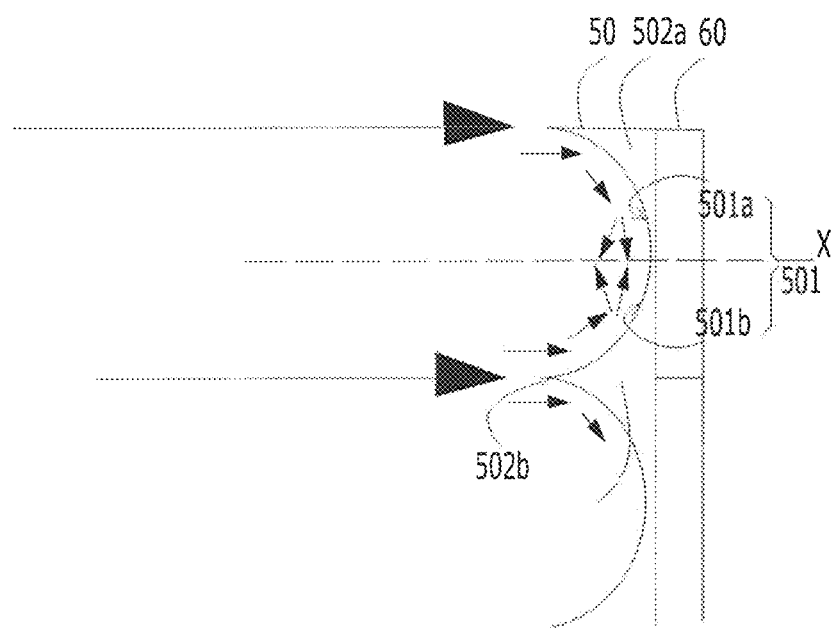
FIG. 21 is a partially enlarged schematic view showing a portion in FIG. 17 where a flowing direction of airflow is shown.

FIG. 17 further shows a flowing direction of the airflow in the annular groove 501, and for the sake of brevity of the figure, only the flowing direction of the airflow in one annular groove 501 at the windward side is shown; FIG. 21 is a partially enlarged schematic view showing a portion in FIG. 17 where the flowing direction of the airflow is shown. Black arrows in FIGS. 1 and 21 indicate flowing directions of the airflow.

It can be seen from FIG. 17, when the airflow enters the annular groove 501, due to the arrangement of the arc-shaped groove wall, in the annular groove 501 at the windward side, a direction of the airflow above the center line of the groove wall may be changed, to allow the airflow to move downward along the arc-shaped upper groove wall 501*a*, and a direction of the airflow below the center line of the groove wall may also be changed, to allow the airflow to move upward along the arc-shaped lower groove wall 501*h*. That is, the airflow moves along a circular arc. In this case, in an intermediate of the arc-shaped groove wall, the upper and lower airflow may collide due to opposite directions, which leads to mixing of the upper and lower airflow, in this way, disordered guidance of a momentum direction of the upwind incoming flow is performed, and direction adjustment of the pressure fluctuation (peak value) of the upwind incoming flow having directions is performed. That is, the direction adjustment is performed, along the circular arc, to allow the directions to be opposite in the vertical direction, so as to reduce the momentum of the pressure fluctuation, which reduces the downwind resistance, decreases a vibration amplitude, and thereby ensuring the stability and safety of the hoisting of the tower 10.

Reference is made to FIG. 19, the above opposite-direction collision of the airflow entering the annular groove 501 at the windward side occurs, and when the airflow moves to the two sides of the windward side along the annular groove 501, the flowing in the annular groove 501 organizes fluctuating flow of the upwind incoming flow, artificially creates a fluctuation in a part of the annular groove in the vertical direction, i.e., the height direction. This fluctuation is a fluctuating driving force which limits the flowing of the airflow in the horizontally defined annular groove 501, and prevents a rate of pressure dropping during a process that the airflow flows in the downstream. In a case that the annular groove 501 is of an annular shape, a pressure difference between the windward side and the leeward side of the tower 10 is reduced correspondingly, which reduces front and rear resistance due to the pressure difference, reduces the downwind resistance, decreases the vibration amplitude, and thereby ensuring the stability and the safety of the hoisting of enclosures such as the tower 10.

As described in the background art, vortex-induced vibration of the tower 10 may also occur, which is caused by that the vortex shedding at the two sides of the tower 10 is consistent when the upwind incoming flow flows around the tower 10. In this solution, since the annular groove 501 is provided, correspondingly, the consistency of the vortex shedding above and below the annular groove 501 is disrupted, thereby suppressing the vortex-induced vibration. Taking FIGS. 17 and 20 as an example, the annular groove 501 is of the annular shape, an annular rib 502 is formed between adjacent annular grooves, the drag reducing device 50 further includes the annular rib 502, and the annular rib 502 is of a ridge-like structure. Due to the annular rib 502 having a ridge 502b, which can sharply cut off the airflow to divide the airflow into two adjacent upper and lower annular grooves 501, and the airflow is divided into upper layer airflow and lower layer airflow, which suppresses development of vortices in grooves at two sides of the annular rib 502 when the upwind incoming flow flows around the surface of the tower 10, thereby suppressing an occurrence of a burst process of the turbulent boundary layer, and reducing an exchange of the airflow momentum in a normal direction. The exchange is the largest at a groove bottom of the annular groove 501, the exchange is concentrated at the groove bottom, and the exchange is weak at positions outside the annular groove and away from the ridge 502b of the annular rib 502, and therefore the resistance is also reduced.

As shown in FIGS. 18 and 19, the ridge-like annular rib 502 (continues or partially discontinuous) is formed between the adjacent upper and the lower annular grooves 501, a ridge shape is a shape like a roof ridge, an outer edge of the annular rib 502 has a shape of a sharp annular line, that is, the annular rib 502 has a ridge 502b, and a longitudinal cross-section of the annular rib 502 is similar to a triangle. Of course, two side walls of the annular rib 502 are a lower groove wall 501b of an upper annular groove and an upper side wall of a lower annular groove 501, respectively. Based on the arc-shaped arrangement of the grooves, the longitudinal cross-section of the annular rib 502 is not a straight-sided triangle, instead, upper and lower sides of the triangle are concaved.

Since the ridge 502b at the outer edge of the annular rib 502 is arranged as an pointed end, as shown in FIG. 21, when the airflow is blown toward the outer surface of the tower 10, the pointed end of the ridge-like annular rib 502 facilitates "splitting" the airflow, so that the airflow enters the annular grooves 501 above and below the annular rib 502 in time instead of directly striking the annular rib 502, to participate in direction change and collision in time, and thereby reducing the resistance, and the purpose of drag reduction is achieved.

Here, the ridge 502b of the annular rib 502 is a rigid ridge having a certain rigidity, which is not easily deformed and can maintain the shape of the ridge 502b under an action of an external force. An elastic hollow body 502a is located below the ridge 502b of the annular rib 502, the elastic hollow body 502a may also be a solid elastic body or a flexible hollow body or a solid flexible body, the ridge 502b and the elastic hollow body 502a (or a solid elastic body or flexible hollow body or solid flexible body) below the ridge 502b may be connected or may be formed integrally. In this way, a portion below the ridge 502b has a certain deformation capability, and may be deformed under the action of the incoming flow, so that the energy of the incoming flow can be transferred and consumed to the two sides, which helps to eliminate or reduce the pressure difference between the windward side and the leeward side of the enclosure, thereby eliminating or reducing the downwind resistance of the enclosure.

Moreover, when the upwind incoming flow flows around the tower 10 and passes by annular ribs 502 and annular grooves 501 on the surface of the tower 10, an aerodynamic coefficient C of the bypassing airflow becomes small, and a vibration amplitude A of vortex-induced resonance can be reduced, thereby reducing the vibration amplitude and ensuring the stability and safety of the hoisting of the enclosure.

As shown in FIG. 17, depths and heights of the annular grooves 501 are marked, and a section of the tower 10 provided with the drag reducing device 50 is divided into three sections from top to bottom. The annular grooves 501 of an upper section each has a depth h1 and a height L1, the annular grooves 501 of an intermediate section each has a depth h2 and a height L2, and the annular grooves 501 of the lower section each has a depth h3 and a height L3. During the arrangement of the drag reducing device 50, the depths and heights of the annular grooves 501 are limited, and a ratio of h1 to L1 ranges from 0.3 to 0.6, to ensure that the airflow can be guided smoothly and collide in the annular groove 501 without increasing the resistance, thereby achieving the purpose of reducing the resistance. Moreover, the larger a radius corresponding to the arc shape of the annular groove 501, the better the drag reduction effect.

Specifically, from bottom to top, the groove depth of the annular groove 501 may be gradually increased, and/or a groove width (the height in FIG. 17) of the annular groove 501 may be gradually increased. It can be seen that, the greater the groove depth is, energy loss due to the opposite-direction collision of the airflow is more; with the gradually increased groove width, more airflow is involved in the collision, the energy loss is more, and correspondingly, the downwind resistance is reduced more. The downwind vibration at the upper portion of the tower 10 is more obvious, for this reason, from bottom to top, the groove depth is designed to be gradually increased, and/or the groove width is gradually increased, to satisfy the requirements of suppressing the downwind vibration of the tower 10.

In this solution, the groove depth of the annular groove 501 is greater than 2 min. If the groove depth is too small, it is disadvantageous for guiding the airflow to the inside of the groove to form opposite-direction collision of the airflow. In general, a thickness of the boundary layer of the airflow ranges from 1 mm to 2 mm, the groove depth herein is greater than 2 min, to satisfy the requirements of the opposite-direction collision of the airflow. Preferably, the groove depth of the annular groove 501 is not greater than 5 mm, to avoid excessively increasing the resistance. Here, designing of the groove depth may be referred to the height of the tower 10. The greater the height of the tower 10, the higher a portion of the tower where the grooves are located, the wind speed is greater, and a relative greater value of the groove depth is selected.

It should be noted that, in the above embodiments, the annular groove 501 is an annular groove surrounding the outer surface of the tower 10, but it can be understood based on the principle of reducing the downwind vibration that, the groove is not limited to a continuous annular shape. For example, a plurality of arc-shaped grooves may be distributed at intervals in the circumferential direction of the tower 10, to form a partially discontinuous annular groove. Of course, an interval may be designed to be relatively small, so that no matter in which direction the upwind incoming flow comes from, it can be blown into the annular groove. Thus, when the upwind incoming flow flows around the tower 10, opposite-direction collision of the airflow may also occur in the annular groove 501, to reduce the downwind resistance. Of course, the solution that the annular groove 501 is of a continuous annular shape is a preferred embodiment.

Here, the frequency mixing and absorbing device 60 and the drag reducing device 50 are arranged together (may be formed integrally or separately). When the upwind incoming flow flows around the tower 10, a part of the airflow directly enters the annular groove 501, another part of the airflow is split by the annular rib 502 to enter the annular groove 501, and is guided in the annular groove 501 of the drag reducing device 50 to collide in opposite directions, so as to reduce the resistance. Moreover, the fluctuating energy of the airflow at the windward side is further absorbed by the frequency mixing and absorbing device 60, thereby achieving the purpose of drag reduction, frequency mixing, and absorption.

It can be understood that, the drag reducing device 50 and the frequency mixing and absorbing device 60 are not limited to be arranged together. For example, in a case that the frequency mixing and absorbing device 60 includes a plurality of annular hollow bodies arranged at intervals in the height direction, the drag reducing device 50 may be arranged between adjacent annular hollow bodies, and the drag reducing device 50 may also be a part of the outer surface of the tower 10, Or, the frequency mixing and absorbing device 60 and the drag reducing device 50 are arranged in different sections, that is, the frequency mixing and absorbing device 60 is arranged within a certain height range, and the drag reducing device 50 is arranged within another height range, Of course, as shown in FIG. 19, the solution that the frequency mixing and absorbing device 60 and the drag reducing device 50 are arranged together to form a drag reducing and frequency mixing and absorbing device 60 surrounding at least a certain height range of the tower 10 is a preferred embodiment, which reduces the downwind resistance to a maximum extent, and is easier to implement technically.

As shown in FIG. 20, the annular groove 501 of the drag reducing device 50 is formed at the base portion, and the elastic hollow body 502a may be located between the groove wall of the annular groove 501 and the base portion, that is, a hollow body is located below the ridge 502b. The hollow body (the elastic hollow body 502a or the flexible hollow body) is filled with gas, liquid or an elastic rubber material, so that a skeleton of the drag reducing device 50 is formed, to ensure that the annular groove 501 and the ridge 502h of the annular rib 502 are not easily deformed, so that splitting of the airflow into upper and lower layers for the drag reduction function is completed, in a case that the hollow body between the groove wall of the annular groove 501 and the base portion is filled with gas or liquid or elastic rubber, the hollow body itself is equivalent to a flexible or elastic hollow body, and further has the deformation capability, so that the pressure difference between the windward side and leeward side of the enclosure can be eliminated or reduced, and thereby eliminating or reducing the downwind resistance of the enclosure. That is, the drag reducing device has the function of the frequency mixing and absorbing device at the same time, which means, the drag reducing device 50 and the frequency mixing and absorbing device 60 are integrally formed and share the base portion close to the outer surface of the tower 10.

Of course, the flexible hollow body 601 of the frequency mixing and absorbing device 60 may be designed to have good deformation capability, however, in a case that the hollow body below the ridge 502b of the drag reducing device 50 has a frequency mixing and absorbing function, the skeleton is required to have certain rigidity. Therefore, when the frequency mixing and absorbing device 60 is separately arranged, the deformation capability is good, and the volume of the flexible hollow body 601 is not excessively limited.

In summary, the present application is specifically focused on the destructive phenomena such as resonance and Karmen vortex street which are likely to occur, from the hoisting of the tower 10 when the wind turbine is located in the airflow during mounting and long-time operation processes, due to coupling of the tower 10 and the airflow; and further on suppressing various destructive phenomena caused by pressure fluctuations and resonance due to coupling of the tower 10 having this structure and the airflow. Therefore, a surface of a novel load-bearing enclosure is provided according to the present application, which changes the original boundary layer formed by the upwind incoming flow flowing around the tower 10 at the outer portion of the tower 10 which is hoisted and mounted in a wind farm, and changes the flow field of the airflow flowing around the tower 10, and safety, absorption and conversion of the wind energy during a later operation process are taken into account. A structure for controlling a natural force fluid-solid coupling airflow field is formed around the surface of the tower 10. The structure changes the flow field on and nearby the surface of the tower 10, weakens the pressure fluctuation on the windward side of the tower 10, prevents the occurrence of vortex street phenomenon at two sides of the leeward side at the rear, prevents a vortex-induced response of the tower 10 and amplification of the vortex-induced response, and suppresses the induced vibration of the tower 10. Accordingly, connecting bolts of the tower 10 can be protected, connecting bolts of the foundation base can also be protected, and fatigue damage to the structure caused by the vibration amplitude can be reduced.

More importantly, when a blade passes by a front of the tower, the absorption of the pressure fluctuation leads to pulsatile decrease of bending moment in the wind direction, the pulsatile decrease of the bending moment is transmitted to a blade root through the rotor, resulting in fluctuating load fatigue damage to a pitch bearing. These hidden dangers of fatigue have long existed in the field of wind power. According to the outer surface structure of the tower 10 in the present application, a frequency mixing and absorbing device 60 is provided, which can reduce the downwind resistance. In a case that the unblocked annular hollow body (the flexible hollow body 601 is of an unblocked annular shape) is provided, which directly reduces the pressure difference between the windward side and the leeward side, reduces a pitching range of the tower in the downwind direction caused by the pressure difference acting on the windward side and the leeward side of the tower, decreases a counteracting force of the windward side of the tower to the upwind incoming flow, and also reduces change frequency of the counteracting three of the windward side to the upwind incoming flow, so that the pressure fluctuation of the airflow at a position in front of the windward side of the tower where the blade passes by is reduced, and thereby reducing the fluctuating pressure acting on the blade when the blade passes by the front of the tower 10 reducing the fluctuation of the bending moment of a force on the blade acting on a bolt connecting position of the pitch bearing at the blade root, and reducing the fatigue damage at the pitch bearing caused by the fluctuation of the bending moment and the load thereof.

Moreover, with the arrangement of the frequency mixing and absorbing device 60 or the drag reducing device 50, the boundary layer on the outer surface of the tower 10 is damaged. The surface structure causes damage to the boundary layer on the outer surface of the tower 10 and upper and lower sections of the nearby flow field, changes the aerodynamic configuration which is formed by the original upwind incoming flow around the tower 10 flowing around the tower 10, disrupting the correlation of a fluctuating wind power in the height direction of the tower 10, so as to prevent the occurrence of the vortex street phenomenon at the windward direction, the rear, and two side walls at the leeward side of the tower 10, and prevent the vortex-induced response of the tower 10 and the amplification of the vortex-induced response, and thereby suppressing the induced vibration of the tower 10. Therefore, the vibration amplitude is decreased, and the stability and the safety of the hoisting of the load-hearing enclosure are ensured.

To build wind power plants in high altitude regions of southern China such as Yunnan, Guizhou, and Sichuan, roads are required to be built around high mountains. In addition, a hoisting period on high mountains is usually longer, uncertainty of the wind may affect the hoisting construction at any time, and the hoisting cost is high. In order to save time and reduce the waste caused by the delay of a construction period and the delay of grid-connection and power generation of the wind turbine due to the uncertainty of the wind, this solution solves the problem of damage and hidden dangers to connecting pieces of the base of the tower 10 caused by sway of the tower 10 structure itself in the hoisting process. On the other hand, the solution is also applicable to offshore wind turbines, that is, the solution is applicable to working conditions that an on-site hoisting progress and an installation period are obviously limited by the wind condition in local regions. The innovation of this solution can ensure or strive for a reliable hoisting of the nacelle when the wind speed is less than 8 m/s and the hoisting of the tower 10 when the wind speed is less than 10 m/s, Under the above two speed conditions, the hoisting of the tower 10 and large parts such as the nacelle may be limited in the conventional technology. Therefore, the implementation of this solution can solve or reduce the problem of the damage and hidden dangers to the connecting pieces of the base of the tower 10 caused by the wind-induced sway of the tower 10 serving as a load-bearing structure of the wind turbine during the hoisting process, which reduces the construction cost, and is beneficial to early grid-connection and power generation of the wind turbine. Moreover, as mentioned before, this solution is also applicable to other flow fields, such as offshore buildings.

It is found during research that, when the tower 10 draws energy from vortices having a same frequency as its own, a structural vibration form at the upper portion of the tower 10 may change, and the changed enclosure of the tower 10 acts on the airflow to allow more and more energy to be concentrated on a fundamental frequency of the tower 10 structure, thereby exciting the lateral vortex-induced resonance of the tower 10 structure. In a case that the upwind incoming flow has certain turbulence intensity, there are energies of various frequency in the incoming flow, the energies are highly dispersive and are fluctuating, vortices with various energies are carried in the incoming flow, and when the airflow passes by the outer surface of the tower 10, an integration effect of the outer surface structure of the tower 10 to the upwind incoming flow is based on a situation that vortices are already in the incoming flow, Therefore, on the basis of the disordered incoming flow, the frequency mixing and absorbing device 60 is used to modify and consume the incoming flow at the boundary layer, and vortices having frequencies different from the fundamental frequency of the vibration of the tower 10 are formed.

In a case that the tower 10 is partially provided with the frequency mixing and absorbing device 60, or the drag reducing device 50 is provided at the same time, which is equivalent to a situation that in a partial section, the overall upwind incoming flow flowing around the tower 10 is divided into multiple layer of surface structures in the height direction, and thus the correlation of the overall upwind airflow in an up-and-down direction of the outer surface of the enclosure tower 10. As a whole, the airflow of the upwind incoming flow is driven to cling to the outer surface of the tower 10, which prevents the occurrence of the boundary layer separation and the Karman vortex street phenomenon, and prevents the formation of vortices at the two sides at the rear of the upper portion of the tower 10, in a case that a drag reducing device 50 shown in FIG. 18 is arranged at the upper portion of the tower 10, a local convex and concave surface is formed, while at the lower portion of the tower, the airflow speed of the bypassing airflow is low, and there is no help of the convex and concave surface. In essence, the original situation that the frequency of the upper vortex shedding may be consistent with that of the lower vortex shedding is completely disrupted, which weakens, reduces or prevents the vortex-induced resonance response when bypass flow detachment of the boundary layer of the outer surface of the tower 10 occurs, and thereby suppressing the lateral vortex-induced vibration, and preventing the vortex-induced vibration at the upper portion of the tower 10.

The correlation is an important feature of a fluctuating wind, here it is related to fluctuating wind speeds at two points $(Z_1, Z_2)$ in the space or fluctuating pressures at two points at different heights on the surface of the tower 10.

A correlation coefficient $\rho$ is defined as $$\rho = \frac{\overline{u'(Z_1)u'(Z_2)}}{\sigma_u(Z_1)\sigma_u(Z_2)},$$

at two different heights ($Z_1$, $Z_2$), the covariance of the fluctuating wind speeds is defined as follows:

$$\overline{u'(Z_1)u'(Z_2)} = \frac{1}{T}\int_0^T [U(Z_1, t) - \overline{U}(Z_1)][U(Z_2, t) - \overline{U}(Z_2)]dt,$$

therefore, the covariance is a time average of a product of the fluctuating wind speeds at the two heights. The wind speed values at the right side of the equation have their respective average values $\overline{U}(Z_1)$ and $\overline{U}(Z_2)$ subtracted respectively, and $U(Z_1, t)$ is the wind speed value at a time t and the height $Z_1$, and $U(Z_2,t)$ is the wind speed value at the time t and the height $Z_2$, that is, the wind speeds at different heights at the same time.

In mathematics, the formula of standard deviation can be expressed as:

$$\sigma_u = \left\{\frac{1}{T}\int_0^T [U(t) - \overline{U}(Z)]dt\right\}^{\frac{1}{2}}.$$

Where, U(t) is a wind speed component in the direction of an average wind speed, which equals to $\overline{U}(Z)+u(t)$; and U(t) is a turbulence component in the downwind direction, that is, a fluctuating wind speed component in the direction of the average wind speed.

The numerator indicates that wind speeds at two different heights of the tower 10 are different and represents the covariance of the fluctuating wind speeds.

The covariance is the time average of the product of the fluctuating wind speeds at the two heights.

The overall intensity of turbulence can be measured by a standard deviation or a root mean square of the wind speeds, an average component is subtracted from each of the wind speeds, then the remainders are quantified by the deviations, the deviations are squared and then averaged, and the averaged value is finally extracted, to obtain a physical quantity having a wind speed unit, thus obtaining the standard deviation. According to the equation of definition of the correlation coefficient, the covariance of wind speeds at different heights is divided by the standard deviation thereof to obtain the correlation coefficient between the two wind speeds at different heights. The smaller the correlation, the better. With a small correlation, the frequencies of vortices at different heights after the vortices are formed can be hindered to be consistent, and the accumulation and increasing of the vortex-induced resonance energy caused by the consistency of the frequencies is destroyed, that is, preventing the growth of the vortex-induced resonance, and even causing the vortex-induced resonance to disappear.

A mean square value of a total fluctuating wind force on the surface of the tower 100 structure is indicated as: $F^2=f[\rho(y_i-y_j)]$, where, $y_i$ and $y_j$ are two points in the vertical height direction on the surface of the tower 10, and $\rho(y_i-y_j)$ is the correlation coefficient of the fluctuating wind force of a section between $y_i$ and $y_j$.

All of the above embodiments are described by taking the tower 10 (which may be a tower on land or a tower of an offshore wind turbine), and the above embodiments are applicable to similar enclosures. For example, television towers, anemometer towers, and other above-mentioned offshore buildings, buildings on water, and etc. it is feasible to provide the above frequency mixing and absorbing device and drag reducing device on the outer surface of this type of enclosures, the principles are the same and will not be described herein.

The above embodiments are only preferred embodiments of the present application. It should be noted that, for those skilled in the art, a few of modifications and improvements may be made to the present application without departing from the principle of the present application, and these modifications and improvements are also deemed to fall into the scope of the present application.

The invention claimed is:

1. An enclosure with a frequency mixing and absorbing device on an outer surface, wherein the enclosure is a tower of a wind turbine, or a television tower, or an anemometer tower; the frequency mixing and absorbing device comprises a deformable body, the deformable body comprises:
 a flexible hollow body arranged on the outer surface of the enclosure and configured to be filled with a gas or a fluid or elastic rubber; and/or,
 an elastic hollow body arranged on the outer surface of the enclosure and configured to be filled with a gas or a fluid or elastic rubber; wherein
 the deformable body is deformable under an action of an incoming flow; and wherein
 the frequency mixing and absorbing device comprises a plurality of deformable bodies, and the deformable bodies are distributed at intervals both in a height direction and a circumferential direction of the enclosure;
 the deformable bodies are arranged in a plurality of rows, each row of the deformable bodies is arranged around the enclosure; and
 in the height direction, the frequency mixing and absorbing device is divided into at least two sections, and heights and/or thicknesses of the deformable bodies arranged in different sections are different.

2. The enclosure with the frequency mixing and absorbing device on the outer surface according to claim 1, wherein in two adjacent rows, an upper row of deformable bodies and a lower row of deformable bodies are arranged to be staggered with respect to each other.

3. The enclosure with the frequency mixing and absorbing device on the outer surface according to claim 1, wherein in a same section of the frequency mixing and absorbing device, an intermediate row of deformable bodies is arranged between two adjacent upper and lower rows of the deformable bodies, a volume of each of the deformable bodies of the intermediate row is smaller than a volume of each of the deformable bodies of the adjacent upper and lower rows; the deformable body of the intermediate row is located right between a deformable body of the upper row and a corresponding deformable body of the adjacent lower row, or the deformable body of the intermediate row directly faces one of the deformable bodies of the upper and lower rows.

4. The enclosure with the frequency mixing and absorbing device on the outer surface according to claim 1, wherein each of the deformable bodies is in a rhombic shape having four concaved side walls.

5. The enclosure with the frequency mixing and absorbing device on the outer surface according to claim 4, wherein a plurality of flow hindering protrusions are arranged between two adjacent rows of the deformable bodies.

6. The enclosure with the frequency mixing and absorbing device on the outer surface according to claim 1, wherein the frequency mixing and absorbing device comprises a plurality of annular bodies surrounding the enclosure, each of the annular bodies is formed by an annular deformable body or by connecting a plurality of independent deformable bodies; the annular body is an annular hollow body, adjacent upper and lower annular hollow bodies are arranged at intervals, and each of the annular hollow bodies is arranged in a wave shape.

7. The enclosure with the frequency mixing and absorbing device on the outer surface according to claim 1, wherein the frequency mixing and absorbing device comprises a base body surrounding the enclosure, and all of the deformable bodies distributed at intervals are arranged at the base body; and the base body is adhered to the outer surface of the enclosure; or the base body is butted at ends in a detachable manner to surround the enclosure.

8. The enclosure with the frequency mixing and absorbing device on the outer surface according to claim 1, further comprising a drag reducing device, wherein the drag reducing device comprises annular grooves arranged around the outer surface of the enclosure in a circumferential direction, a cross section of each of the annular grooves is arc-shaped, a ridge-like annular rib is formed between each two adjacent upper and lower annular grooves, the drag reducing device comprises the annular rib, and the drag reducing device is arranged at least in a partial height range of the enclosure.

9. The enclosure with the frequency mixing and absorbing device on the outer surface according to claim 8, wherein the annular rib comprises a rigid ridge, and an elastic hollow body or a solid elastic body or a flexible hollow body or a solid flexible body below the ridge.

10. The enclosure with the frequency mixing and absorbing device on the outer surface according to claim 9, wherein in a case that the annular rib comprises the rigid ridge, and the elastic hollow body or the flexible hollow body below the ridge, the elastic hollow body or the flexible hollow body is filled with a gas or a fluid or elastic rubber.

11. The enclosure with the frequency mixing and absorbing device on the outer surface according to claim 8, wherein the annular groove is configured to surround the enclosure, and the annular groove is a continuous or partially discontinuous annular groove, and a continuous or partially discontinuous annular rib is formed between each two adjacent upper and lower annular grooves.

12. The enclosure with the frequency mixing and absorbing device on the outer surface according to claim 8, wherein the frequency mixing and absorbing device comprises a base body surrounding the enclosure, the deformable body is arranged at an outer side of the base body, and the drag reducing device is arranged at an outer side of the deformable body.

13. The enclosure with the frequency mixing and absorbing device on the outer surface according to claim 12, wherein the drag reducing device comprises a base portion, the annular grooves are formed at the base portion, the base portion is attached to an outer side of the frequency mixing and absorbing device; or, the deformable body is located below the ridge of the annular rib, the drag reducing device is the frequency mixing and absorbing device, and a deformable body of the drag reducing device is the deformable body of the frequency mixing and absorbing device.

14. The enclosure with the frequency mixing and absorbing device on the outer surface according to claim 1, wherein the enclosure is the tower of the wind turbine, at least an upper portion of the tower is provided with the frequency mixing and absorbing device, and the upper portion is above ½ of a height of the tower.

* * * * *